(12) United States Patent
Van Wageningen et al.

(10) Patent No.: US 10,263,469 B2
(45) Date of Patent: Apr. 16, 2019

(54) WIRELESS INDUCTIVE POWER TRANSFER

(71) Applicant: KONINKLIJKE PHILIPS N.V., Eindhoven (NL)

(72) Inventors: Andries Van Wageningen, Wijlre (NL); Klaas Jacob Lulofs, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 278 days.

(21) Appl. No.: 14/890,785

(22) PCT Filed: May 23, 2014

(86) PCT No.: PCT/EP2014/060593
§ 371 (c)(1),
(2) Date: Nov. 12, 2015

(87) PCT Pub. No.: WO2014/195143
PCT Pub. Date: Dec. 11, 2014

(65) Prior Publication Data
US 2016/0087691 A1    Mar. 24, 2016

(30) Foreign Application Priority Data
Jun. 4, 2013    (EP) .................................... 13170338

(51) Int. Cl.
*H02J 50/00*    (2016.01)
*H02J 50/12*    (2016.01)
(Continued)

(52) U.S. Cl.
CPC .............. *H02J 50/12* (2016.02); *H02J 5/005* (2013.01); *H02J 7/025* (2013.01); *H02J 50/10* (2016.02);
(Continued)

(58) Field of Classification Search
CPC ...... H04B 5/00; H04B 5/0031; H04B 5/0037; H02J 50/80
(Continued)

(56) References Cited

U.S. PATENT DOCUMENTS 9,660,478 B2 * 5/2017 Von Novak ............. H02J 7/025
2009/0284245 A1 * 11/2009 Kirby ................... G06K 7/0008
323/318

(Continued)

FOREIGN PATENT DOCUMENTS

EP    1734635 A2    12/2006
EP    2579424 A2    4/2013
(Continued)

OTHER PUBLICATIONS

"System Description Wireless Power Transfer", vol. 1: Low Power, Part 1: Interface Definition, Oct. 2010, 85 Pages.

*Primary Examiner* — Adi Amrany

(57) ABSTRACT

A power transmitter (101) is arranged to transfer power to a power receiver (105) via a wireless inductive power transfer signal transmitted from a transmit coil (103) to a power receiver (105). A first communication unit (305) communicates a message to the power receiver (105) on a first communication link A second communication unit (307) receives data from the power receiver (105) on a separate second communication link having a longer range. The power receiver (105) comprises a third communication unit (405) which receives the first message. A response generator (407) generates a response message to the message and a fourth communication unit (409) transmits the response message to the power transmitter (103) over the second communication link. The power transmitter (103) determines an expected response message to the message and a power controller (303) controls the power level of the power (Continued)

transfer signal dependent on whether a message is received on the second communication link corresponding to the expected response message.

21 Claims, 11 Drawing Sheets

(51) Int. Cl.
    *H02J 50/40* (2016.01)
    *H02J 50/80* (2016.01)
    *H02J 5/00* (2016.01)
    *H02J 7/02* (2016.01)
    *H04B 5/00* (2006.01)
    *H02J 50/10* (2016.01)
    *H02J 7/00* (2006.01)

(52) U.S. Cl.
    CPC .............. *H02J 50/40* (2016.02); *H02J 50/80* (2016.02); *H04B 5/0037* (2013.01); *H02J 2007/0001* (2013.01)

(58) Field of Classification Search
    USPC ........................................................ 307/104
    See application file for complete search history.

(56) References Cited

U.S. PATENT DOCUMENTS

| | | | |
|---|---|---|---|
| 2009/0286475 A1* | 11/2009 | Toncich | G06K 7/0008 455/41.1 |
| 2010/0146308 A1 | 6/2010 | Gioscia et al. | |
| 2010/0270867 A1* | 10/2010 | Abe | H02J 7/025 307/104 |
| 2011/0022755 A1 | 1/2011 | Sueyoshi et al. | |
| 2012/0267960 A1* | 10/2012 | Low | H04B 5/0037 307/104 |
| 2012/0299391 A1 | 11/2012 | Tanabe | |
| 2012/0326658 A1* | 12/2012 | Kim | H02J 7/00 320/108 |
| 2012/0329405 A1* | 12/2012 | Lee | H02J 17/00 455/73 |
| 2013/0300358 A1* | 11/2013 | Kirby | G06K 7/0008 320/108 |
| 2014/0159651 A1* | 6/2014 | Von Novak | H04B 5/0037 320/108 |

FOREIGN PATENT DOCUMENTS

| | | |
|---|---|---|
| WO | 2007093937 A2 | 8/2007 |
| WO | 2012058724 A1 | 5/2012 |

* cited by examiner

FIG. 8

WIRELESS INDUCTIVE POWER TRANSFER

CROSS-REFERENCE TO PRIOR APPLICATIONS

This application is the U.S. National Phase application under 35 U.S.C. § 371 of International Application No. PCT/EP2014/060593, filed on May 23, 2014, which claims the benefit of European Patent Application No. EP13170338.1, filed on Jun. 4, 2013. These applications are hereby incorporated by reference herein.

FIELD OF THE INVENTION

The invention relates to inductive power transfer and in particular, but not exclusively, to an inductive power transfer system in accordance with the Qi wireless power transfer standard.

BACKGROUND OF THE INVENTION

Many systems require a wiring and/or electrical contacts in order to supply electrical power to devices. Omitting these wires and contacts provides for an improved user experience. Traditionally, this has been achieved using batteries located in the devices but this approach has a number of disadvantages including extra weight, bulk and the need to frequently replace or recharge the batteries. Recently, the approach of using wireless inductive power transfer has received increasing interest.

Part of this increased interest is due to the number and variety of portable and mobile devices having exploded in the last decade. For example, the use of mobile phones, tablets, media players etc. has become ubiquitous. Such devices are generally powered by internal batteries and the typical use scenario often requires recharging of batteries or direct wired powering of the device from an external power supply.

As mentioned, most present day devices require a wiring and/or explicit electrical contacts to be powered from an external power supply. However, this tends to be impractical and requires the user to physically insert connectors or otherwise establish a physical electrical contact. It also tends to be inconvenient to the user by introducing lengths of wire. Typically, power requirements also differ significantly, and currently most devices are provided with their own dedicated power supply resulting in a typical user having a large number of different power supplies with each power supply being dedicated to a specific device. Although, internal batteries may prevent the need for a wired connection to an external power supply, this approach only provides a partial solution as the batteries will need recharging (or replacing which is expensive). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers which have a tight coupling between the primary transmitter coil and the secondary receiver coil. By separating the primary transmitter coil and the secondary receiver coil between two devices, wireless power transfer between the devices becomes possible based on the principle of a loosely coupled transformer.

Such an arrangement allows a wireless power transfer to the device without requiring any wires or physical electrical connections. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer standard known as the Qi standard has been defined and is currently being developed further. This standard allows power transmitter devices that meet the Qi standard to be used with power receiver devices that also meet the Qi standard without these having to be from the same manufacturer or having to be dedicated to each other. The Qi standard further includes some functionality for allowing the operation to be adapted to the specific power receiver device (e.g. dependent on the specific power drain).

The Qi standard is developed by the Wireless Power Consortium and more information can e.g. be found on their website: http://www.wirelesspowerconsortium.com/index.html, where in particular the defined Standards documents can be found.

In order to support the interworking and interoperability of power transmitters and power receivers, it is preferable that these devices can communicate with each other, i.e. it is desirable if communication between the power transmitter and power receiver is supported, and preferably if communication is supported in both directions.

The Qi standard supports communication from the power receiver to the power transmitter thereby enabling the power receiver to provide information that may allow the power transmitter to adapt to the specific power receiver. In the current standard, a unidirectional communication link from the power receiver to the power transmitter has been defined and the approach is based on a philosophy of the power receiver being the controlling element. To prepare and control the power transfer between the power transmitter and the power receiver, the power receiver specifically communicates information to the power transmitter.

The unidirectional communication is achieved by the power receiver performing load modulation wherein a loading applied to the secondary receiver coil by the power receiver is varied to provide a modulation of the power signal. The resulting changes in the electrical characteristics (e.g. variations in the current draw) can be detected and decoded (demodulated) by the power transmitter. In this approach, the power transfer signal is essentially used as a carrier which is modulated by the power receiver by this modulating a load on power receiver coil by e.g. switching impedance that is connected to the power receiver coil on and off.

However, a limitation of the Qi system is that it does not support communication from the power transmitter to the power receiver. In order to address this, various communication approaches have been proposed. For example, it has been proposed to communicate data from the power transmitter to the power receiver by modulating the power transfer signal with a suitable signal representing the data to be transmitted. E.g. small frequency variations representing the data may be superposed on the power transfer signal.

In general, communication between power receiver and power transmitter is faced with multiple challenges and difficulties. In particular, there is typically a conflict between the requirements and characteristics for the power signal in transferring power and the requirements and preferences for the communication. Typically, the system requires close interaction between the power transfer and communication functions. For example, the system is designed based on the concept of only one signal being inductively coupled between the transmitter and the power receiver, namely the power signal itself. However, using the power signal itself for not only performing a power transfer but also for carrying information results in difficulties due to the varying operating characteristics.

As a specific example, using a load modulation approach wherein the power receiver communicates data by modulating the load of the power signal (such as in the Qi system) requires that the normal load is relatively constant. However, this cannot be guaranteed in many applications.

E.g., if wireless power transfer is to be used to power a motor driven appliance (such as e.g. a blender), the motor current tends to be quite erratic and discontinuous. Indeed, when a motor driven appliance draws current, the amplitude of the current is strongly related to the load of the motor. If the motor load is changing, the motor current is changing as well. This results in the amplitude of the current in the transmitter also changing with the load. This load variation will interfere with the load modulation, resulting in degraded communication. Indeed, in practice it is typically very difficult to detect load modulation for loads that include a motor as part of the load. Therefore, in such scenarios, the number of communication errors is relatively high or the communication may utilize a very high data symbol energy, thereby reducing the possible data rate very substantially.

In order to address the problems with load modulation, it has been proposed to use a separate and independent communication link from the power receiver to the power transmitter. Such an independent communication link may provide a data path from the power receiver to the power transmitter which is substantially independent of the power transfer operation and dynamic variations. It may also provide a higher bandwidth and often a more robust communication.

However, there are also disadvantages associated with using an independent communication link. For example, the use of separate communication channels could result in interference between the operations of different power transfers which could result in a potentially dangerous situation with high power levels. For example, the control operations may interfere with each other, e.g. by the control data from the power receiver of one power transfer operation being used to control the power transfer to another nearby power receiver The separation between communication and power transfer signals may result in less robust and less fail safe operation.

Hence, an improved power transfer system would be advantageous and in particular a system allowing improved communication support, increased reliability, increased flexibility, facilitated implementation, reduced sensitivity to load variations, improved safety and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided A wireless power transfer system comprising: a power transmitter comprising: a transmit power transfer coil for transferring power to a power receiver via a power transfer signal, a first communication unit for communicating messages to the power receiver on a first communication link using a first communication coil being at least one of the transmit power transfer coil and a transmit communication coil proximal to the transmit power transfer coil, the first communication unit being arranged to transmit a first message to the power receiver, the first communication link having a range corresponding to a power transfer range for the power transfer signal; a second communication unit arranged to receive data from the power receiver on a second communication link, the second communication link not using the first communication coil and having a range exceeding the range of the first communication link, and a power receiver comprising: a receive power transfer coil for receiving the power transfer signal, a power load coupler for providing power to a load from the power transfer signal, a third communication unit for receiving messages from the power transmitter on the first communication link using a second communication coil being at least one of the receive power transfer coil and a receive communication coil proximal to the receive power transfer coil, the third communication unit being arranged to receive the first message from the power transmitter, a response generator for generating a response message in response to the first message, the response comprising a first property indication of a property of the first message, a fourth communication unit for transmitting the response message to the power transmitter over the second communication link not using the second communication coil; the power transmitter further comprising: a response processor for determining an expected response message to the first message, the expected response message comprising an expected property indication for the property of the first message; a validity checker for generating a confirmation indication indicative of whether a message is received on the second communication link corresponding to the expected response message, the confirmation indication being indicative of whether the property indication matches the expected property indication; a power controller for controlling a power level of the power transfer signal in response to the confirmation indication.

The invention may provide improved operation in many embodiments and scenarios, and may in particular reduce risks of interference between different power transfer operations. For example, it may reduce the risk that a given power transfer operation could be affected or controlled by a data communication relating to another proximal power transfer operation. The approach may allow a reliable association between a separate communication link and a power transfer operation. The association can be achieved without requiring the second communication link to have geometric restrictions, such as e.g. restrictions on positions of the communication means relative to the power transfer coils.

The invention may allow a power transfer system to effectively use asymmetric communication for forward (from power transmitter to power receiver) and reverse (from power receiver to power transmitter) communication. In particular, the invention may in many embodiments allow a reverse communication link to be implemented without requiring this to be a short range communication link, and specifically without requiring this to have a range similar to the range for power transfer and/or forward communication. For example, a standard communication technology having a communication range of e.g. several meters or tens of meters may be used for reverse communication. Furthermore, such a communication approach can be used while still preventing or substantially reducing the risk of messages from other power receivers being used by the power transmitter to control power transfer. Effectively, the invention may in many embodiments achieve that the usable range for messages from power receivers is restricted to the communication range of the forward (first) communication link (and thus to a power transfer range) despite the actual communication range for the reverse (second) communication link being potentially much higher. Accordingly, the approach may ensure that only messages from power receivers sufficiently close to the transmitter coil to be powered by this are used to control the power level of the power transfer signal.

The Inventors have realized that while the current proposal for using a separate communication link for communication from the power receiver to the power transmitter may provide advantages, it is also associated with potential risks and could in worst case scenarios result in wrong power levels. For example, if a device comprising a power receiver is moved from one transmit power transfer coil to an adjacent transmit power coil, the separate communication link could remain unaffected and this could potentially result in the previous power transfer coil rather than the new power transfer coil being controlled by the data transmitted on the separate communication link. This could result in wrong power levels being provided to both the power receiver on the new power transfer coil as well as to any power receiver devices being positioned on the original power transfer coils. The current approach may be used to reduce the risks of such situations occurring, and may be used to ensure that the control of the power transfer for the power receiver is indeed controlled by the communications from that power receiver (and that these communications do not affect any other power transfers).

The approach may thus allow a separate communication link to be used thereby allowing the disadvantages of load modulation, and in particular the sensitivity to load variations, to be mitigated or avoided.

The approach may further reduce the requirement for timings of messages from the power receiver. Specifically, the consideration of whether the response message comprises a property of the first message may allow the validity checker to determine whether the response message is from an expected source without necessarily requiring this to be transmitted with any specific time relationship with the first message. For example, in many embodiments, it may not be required that the response message is received within a given duration of the first message.

The power transfer signal may be a wireless inductive power signal, and may specifically be represented by the electromagnetic flux between the transmit power transfer coil and receive power transfer coil. The transmit power transfer coil, receive power transfer coil, communication transmit coil, and/or communication receive coil may be any suitable inductors and may in particular be planar coils.

As a specific example, the receive power transfer coil may be a receive power transfer entity for inductive heating, such as specifically a planer continuous electrical element. In some embodiment, the receive power transfer coil may thus for example be an electrically conductive element which is heated by induced eddy currents or additionally by hysteresis losses due to ferromagnetic behavior. In some embodiments, the receive coil may accordingly also itself provide (and be) the load as well as the power load coupler.

The receive power transfer entity may be constructed from any suitable material that converts the electromagnetic signal to heat and may in particular be a plate.

In many embodiments, the receive power transfer coil and receive communication coil may be arranged concentrically (with either coil being the inner coil) and possibly even overlap. In many embodiments, the transmit power transfer coil and transmit communication coil may be arranged concentrically (with either coil being the inner coil) and possibly even overlap.

In many embodiments, a smallest rectangular volume (or for planar coils the smallest rectangular area) comprising both the receive power transfer coil and the communication receive coil will not exceed four times (or in many embodiments two or 1.5 times) that of a smallest rectangular volume comprising the receive power transfer coil.

In many embodiments, a smallest rectangular volume (or for planar coils the smallest rectangular area) comprising both the transmit power transfer coil and the communication transmit coil will not exceed four times (or in many embodiments two times) that of a smallest rectangular volume comprising the transmit power transfer coil.

The second communication link may use different inductors than the transmit power transfer coil, receive power transfer coil, communication transmit coil and communication receive coil. In many embodiments, the second communication link may not be based on the formation of a (loosely coupled) transformer between the power receiver and the power transmitter. For example, in many embodiments a wireless communication may be formed using suitable antennas. The second communication link may for example be implemented using Near Field Communication (NFC), Wi-Fi communication, Bluetooth™ communication or similar.

The second communication link will typically be independent of the power transfer and indeed of any communication from the power transmitter to the power receiver. The second communication link will typically be substantially decoupled from the power transfer signal, e.g. spatially or by frequency. The second communication link will accordingly typically be independent of load variations, and indeed of the specific characteristics of the power transfer operation.

The second communication link may furthermore be used to transmit other data from the power receiver to the power transmitter, such as control data and specifically power control data. Thus, the system allows improved communication while maintaining or improving safe and reliable power transfer operation.

The range of the first communication link corresponds to the power transfer range. In many embodiments, the first communication link has a communication range which does not exceed 200%, 150%, 120%, or even 100% of the power transfer range. In many embodiments, the first communication link is formed by a modulation of the power transfer signal. In such a scenario, the first communication link communication range and the power transfer range will inherently be substantially the same. In many embodiments, implementation of the forward communication link by modulation of the power transfer signal inherently and directly means that the communication range of the first communication link corresponds to the power transfer range.

In some embodiments, the effective range of the first communication link may be lower than range at which power could theoretically be provided. However, in such embodiments, power transfer will typically only be allowed if the first communication link can be established. Thus, in the case of the communication range being less than 100% of the possible range for power transfer, the actual power transfer range supported will typically be limited by the communication range of the first communication link. This, tends to intrinsically provide safe operation as power transfer is only allowed if communication is possible.

In many embodiments, the power transfer range is no more than 50 cm or 20 cm. The communication range corresponds to the power transfer range by having a communication range of no more than 50 cm or 20 cm. In many embodiments, the communication range of the second communication link may be no less than 30 cm, 60 cm or 100 cm.

In many scenarios, a plurality of power transmitters may e.g. be positioned within a limited area. It may typically be possible for these power transmitters to simultaneously support power transfer to a plurality of power receivers. The approach may be particularly advantageous for such situations, and may provide improved reliability and increased certainty that the correct data from the power receivers is used for the correct power transfer. For example, the approach may reduce the risk of a power receiver using one transmitter being controlled by data provided by another power receiver using another coil.

In many embodiments, the power transmitter may include a plurality of power transmitter coils, such as for example an array of coils. The transmit power transfer coil may thus be one of a plurality of coils that may possibly support the power transfer to the power receiver. It may typically be possible for the power transmitter to simultaneously support power transfer to a plurality of power receivers using different coils. The approach may be particularly advantageous for such embodiments, and may provide improved reliability and increased certainty that the correct data from the power receivers is used for the correct power transfer. For example, the approach may reduce the risk of a power receiver using one coil being controlled by data provided by another power receiver using another coil.

The response message may be any message which takes the first message into account (in any form) in order to generate an indication of the property of the first message. As such, it may include messages that are generated as a result of the power receiver receiving the first message. It may also include messages that are not generated as a result of the first message being received but which includes an indication of the first message being received, such as an indication of data comprised in the first message. Specifically, the response message term may include any message generated in response to the first message and including a property of this first message, and in particular any message derived from data of the first message. The response message may e.g. be a message that is required to be transmitted anyway by the system but which is modified based on the first message, such as e.g. by including data derived from the first message (or data thereof). Specifically, the response message may be a power control message which is modified to include data derived from the first message (even if the transmission of power control messages is not caused or triggered by the first message being received). It will also be appreciated that a plurality of response messages may be generated for the first message. For example, a sequence of power control messages may be generated which include power control messages as well as data derived from the first message. Each of these power control messages can be considered a response message for the first message.

The indication of the property may be any indication that reflects a parameter determined from a property of the first message. The property may be any property of a first message signal, such as a frequency, phase, or amplitude pattern or value. In many embodiments, the indication of a property of the first message may be an indication of a data content of the first message. The property may be a property which may vary (and typically be different) between first messages from different power transmitters. In many embodiments, the property will be different for different power transmitters. The power transmitter may specifically generate the first message to have a first property to provide an identity indication for the power transmitter (or possibly the specific power transmitter inductor). The identity indication may in some embodiments be unique to the power transmitter. In other embodiments, the identity indication may be indicative of an identity value out of a plurality of identity values. Other power transmitters may be allocated other identity values from the plurality of identity values. Specifically, in some embodiments, the first property may correspond to power transmitter identity data included in or represented by the first message.

The validity checker may generate the confirmation indication being indicative of whether the property indication matches the expected property indication in accordance with any match criterion. For example, a similarity measure may be generated by comparing the received property indication to the expected property indication. The validity checker may generate the confirmation indication to reflect this similarity value. In particular, a match may be considered to occur if (and only if) the similarity measure exceeds a threshold. For example, the expected property indication may be expected power transmitter identity data, and this may be compared to power transmitter identity data received in the response message.

In accordance with an optional feature of the invention, the first communication unit is arranged to generate the first message to comprise first data, the response generator is arranged to generate response data from the first data and to include the response data in the response message; the response processor is arranged to determine expected response data in response to the first data; and the validity checker is arranged to generate the confirmation indication in response to an evaluation of whether the message received on the second communication link comprises data matching the expected response data.

This may provide improved performance and may in particular allow improved reliability and robust operation. The approach may for example allow the power receiver to provide information that allows further characteristics to be taken into account when controlling the power level and power transfer.

The power controller may control the power level in response to the confirmation indication, and thus the power control may be dependent on whether the second communication unit receives a message over the second communication unit which comprises data that is expected to be provided by the power receiver in response to the data transmitted to the power receiver from the power transmitter. The approach allows an improved connection between the power transfer and the communication from the power transmitter to the power receiver, and the communication from the power receiver using the second communication link. Thus, improved certainty that the second communication link is indeed with the same power receiver as that of the power transfer can be achieved.

In accordance with an optional feature of the invention, the first data comprises an indication of at least one of an identity of the power transmitter and an identity of the transmit power transfer coil.

This may provide improved performance, improved reliability, and/or increased safety of operation in many embodiments and scenarios. In particular, it may reduce the risk of the power transfer being controlled by another power receiver than the intended power receiver. This may for example especially be relevant if multiple power receiver devices sending control messages are present near the power transmitter.

For example, for a scenario wherein a plurality of power transmitters are positioned within a limited area, the approach may provide reliable operation for different simultaneous power transfer operations supported by these transmitters. This may include scenarios in which the power receivers are moved between different power transmitters.

As another example, for power transmitters that include a plurality of power transmitter coils and which have the capability to support simultaneous power transfer to a plurality of power receivers, the inclusion of an identity of the transmit power transfer coil may allow the system to ensure reliable operation for the different simultaneous power transfer operations, including in scenarios where the power receiver devices are moved between different transmit power transfer coils.

The power receiver may specifically generate response data that comprises an indication of the received identity of the power transmitter and/or of the transmit power transfer coil. The expected response data may be an indication of an identity of the power transmitter and/or of the transmit power transfer coil, and thus the confirmation indication may indicate whether data of the message received by the power transmitter over the second communication link comprises such an indication of the identity of the power transmitter and/or of the transmit power transfer coil.

In accordance with an optional feature of the invention, the first data comprises an indication of at least one of a transmit time for the first message and a message identity.

This may provide improved performance, improved reliability, and/or increased safety of operation in many embodiments and scenarios. The approach may in particular allow the system to react to dynamic changes in the operation or setup. For example, it may allow the system to react to scenarios wherein the power receiver is moved, e.g. from one transmitter to another transmitter, or from one transmit power transfer coil to another.

The power receiver may specifically generate response data which comprises an indication of the transmit time for the first message. The expected response data may include an indication of the transmit time for the first message, and thus the confirmation indication may be generated to indicate whether data of the message received by the power transmitter over the second communication link comprises such an indication of the transmit time for the first message. The confirmation indication may also be generated to reflect whether a delay relative to the transmit time does not exceed a threshold.

The transmit time may be an absolute or relative time indication. The indication of the transmit time need not directly describe a time instant but may for example be a sequence number, such as a message number.

The message identity may for example also be used to determine delays in the power transmitter receiving a response to the first message. For example, the power transmitter may store transmit times for individual messages, and if a response message is received comprising a message identity, the power transmitter may extract the stored transmit time for that message and determine the delay before the response was received.

In accordance with an optional feature of the invention, the validity checker may be arranged to determine a time delay from transmission of the first message to receipt of the message on the second communication link, and to determine the confirmation indication in response to the time delay.

This may provide improved performance, improved reliability, and/or increased safety of operation in many embodiments and scenarios. The approach may in particular allow the system to react to dynamic changes in the operation or setup. For example, it may allow the system to react to scenarios wherein the power receiver is moved, e.g. from one transmit power transfer coil to another.

The validity checker may for example be arranged to associate the received message with the first message in response to data comprised in the received message. For example, the first message may comprise variable data which is indicated in the response message generated by the power receiver. The validity checker may extract an indication of variable data from the received message and compare it to the variable data of the first message. If a match is detected, the time delay between transmitting the first message and receiving the received message is determined based on an internal timer of the power transmitter.

As another example, the first message may comprise a transmit time indication, and the power receiver may include an indication of this transmit time in the response message. The power transmitter may extract an indication of such a transmit time from the received message. The corresponding transmit time may be compared to a current time and the corresponding delay may be determined.

The confirmation indication may specifically be set to indicate that the received message does not correspond to the expected response message if the delay exceeds a threshold.

In accordance with an optional feature of the invention, the power transmitter is arranged to repeatedly transmit first messages, and the power transmitter is arranged to repeatedly generate confirmation indications for messages received on the second communication link.

This may provide improved performance, improved reliability, and/or increased safety of operation in many embodiments and scenarios. The approach may in particular allow the system to react to dynamic changes in the operation or setup. For example, it may allow the system to react to scenarios wherein the power receiver is moved, e.g. from one transmit power transfer coil to another.

The power controller may repeatedly control the power in response to the confirmation messages, and may specifically be arranged to restrict the power level to below a given power threshold unless a confirmation message indicative of expected response messages having been received are generated.

The transmission of first messages and the generation of confirmation messages from received response messages are not necessarily synchronized. For example, in many embodiments, a plurality of response messages may be received for each first message, and a confirmation indication may be generated for each received response message.

In some embodiments, the first communication unit is arranged to generate the first message to comprise first data, the response generator is arranged to generate response data from the first data and to include the response data in the response message; the response processor is arranged to determine expected response data in response to the first data; and the validity checker is arranged to generate the confirmation indication in response to an evaluation of whether the message received on the second communication link comprises data matching the expected response data.

In accordance with an optional feature of the invention, the power transmitter is arranged to restrict the power level to not exceed a threshold unless expected response messages are received for the first messages within a time interval from the first messages being transmitted.

This may provide improved performance, improved reliability, and/or increased safety of operation in many embodiments and scenarios. The approach may in particular allow the system to react to dynamic changes in the operation or setup.

Especially in case a plurality of response messages may be received for each first message, the power transmitter can validate if these response messages are, from a timing point of view, related to the first message.

In accordance with an optional feature of the invention, a time interval between consecutive first messages does not exceed 500 msec.

This may allow the system to detect potentially erroneous situations sufficiently fast to prevent hazardous operation.

In accordance with an optional feature of the invention, the power transmitter is arranged to transmit the first message in response to an event from the group consisting of: an expiry of a time interval; a detection of a movement of the power receiver; a detection of a change in a load of the transmit power transfer coil; a detection of a change in a load of the transmit communication coil.

This may provide improved performance, improved reliability, and/or increased safety of operation in many embodiments and scenarios.

In accordance with an optional feature of the invention, the power receiver is arranged to transmit a message request to the power transmitter; and the power transmitter is arranged to transmit the first message in response to receiving the message request.

This may provide improved and/or facilitated operation in many scenarios, and may specifically allow the power receiver to control the operation of the verification of the second communication link despite this being based on messages transmitted from the power transmitter.

In accordance with an optional feature of the invention, the power receiver is arranged to transmit the message request in response to an event from the group consisting of: an expiry of a time interval; a detection of a movement of the power receiver; a detection of a change in the power transfer signal; a detection of a change in a signal received by the receive communication coil.

This may provide improved performance, improved reliability, and/or increased safety of operation in many embodiments and scenarios.

In accordance with an optional feature of the invention, the first communication coil is the transmit power transfer coil; and the first communication unit is arranged to modulate the first message onto the power transfer signal.

This may provide improved performance, improved reliability, and/or increased safety of operation in many embodiments and scenarios. In particular, it may reduce the risk of the power transmitter being incorrectly positioned and may provide increased certainty that the second communication link is supporting the desired power transfer operation.

In accordance with an optional feature of the invention, the power transmitter is arranged to modulate the first message onto a ping power transfer signal.

This may provide improved reliability, and may specifically in many embodiments allow the second communication link to be verified prior to any power transfer. This may e.g. prevent the system initializing in an undesired or even potentially hazardous configuration.

In accordance with an optional feature of the invention, the power controller is arranged to restrict the power level to not exceed a power limit unless the confirmation indication is indicative of the message received on the second communication link matching the expected response message.

This may provide increased reliability and/or safety. In some embodiments, the threshold may be zero, i.e. no power transfer signal is generated for the power transfer if the second communication link cannot be verified.

In accordance with an optional feature of the invention, the first communication coil is the communication transmit coil, and a distance from a center of the transmit power transfer coil to an outer winding of the transmit communication coil is no more than twice a distance from the center of the transmit power transfer coil to an outer winding of the transmit power transfer coil.

This may provide increased reliability and/or safety. In particular, it may ensure that the transmit power transfer coil and the communication transmit coil are sufficiently close together that the communication using the communication transmit coil provides a reliable indication that the power receiver is positioned appropriately with respect to the transmit power transfer coil to allow efficient power transfer.

In some embodiments, the distance from the center of the transmit power transfer coil to the outer winding of the communication transmit coil is no more than 50%, or even 20%, larger than the distance from the center of the transmit power transfer coil to the outer winding of the transmit power transfer coil.

In some embodiments, the second communication coil is the communication receive coil, and a distance from a center of the receive power transfer coil to an outer winding of the communication receive coil is no more than twice a distance from the center of the receive power transfer coil to an outer winding of the receive power transfer coil.

In some embodiments, the distance from the center of the receive power transfer coil to the outer winding of the communication receive coil is no more than 50%, or even 20%, larger than the distance from the center of the receive power transfer coil to the outer winding of the receive power transfer coil.

In some embodiments, the second communication coil is the communication receive coil, and, for each point on an outer edge of the communication receive coil, the shortest distance to a part of the receive power transfer coil is no more than 50% (and in some embodiments 25%) of a distance between two opposite points of an outside of the receive power transfer coil.

In some embodiments, the first communication coil is the communication transmit coil, and, for each point on an outer edge of the communication transmit coil, the shortest distance to a part of the transmit power transfer coil is no more than 50% (and in some embodiments 25%) of a distance between two opposite points of an outside of the transmit power transfer coil.

In accordance with an optional feature of the invention, the response message comprises an indication of a received power level for the power transfer signal, and the power controller is arranged to restrict the power level of the power transfer signal to below a power limit if the indication of the received power level indicates a received power level below a threshold.

This may provide improved performance, improved reliability, and/or increased safety of operation in many embodiments and scenarios.

The received power level may be give as a relative value e.g. to a reference value at the power receiver. This may allow the power transmitter to apply the same threshold for all power receivers.

According to an aspect of the invention there is provided a power transmitter for a wireless power transfer system comprising: a transmit power transfer coil for transferring power to a power receiver via a power transfer signal; a first communication unit for communicating messages to the power receiver on a first communication link using a first communication coil being at least one of the transmit power transfer coil and a transmit communication coil proximal to the transmit power transfer coil, the first communication unit being arranged to transmit a first message to the power receiver, the first communication link having a range corresponding to a power transfer range for the power transfer signal; a second communication unit arranged to receive data from the power receiver on a second communication link, the second communication link not using the first communication coil and having a range exceeding the range of the first communication link; a response processor for determining an expected response message to the first message the expected response message comprising an expected property indication for a property of the first message; a validity checker for generating a confirmation indication indicative of whether a message is received on the second communication link corresponding to the expected response message and comprising a property indication corresponding to the expected property indication; and a power controller for controlling a power level of the power transfer signal in response to the confirmation indication.

According to an aspect of the invention there is provided a power receiver for a wireless power transfer system comprising: a receive power transfer coil for receiving a power transfer signal from a power transmitter; a power load coupler for providing power to a load from the power transfer signal; a first communication unit for receiving messages from the power transmitter on a first communication link using a second communication coil being at least one of the receive power transfer coil and a receive communication coil proximal to the receive power transfer coil, the third communication unit being arranged to receive a first message from the power transmitter and the first communication link having a range corresponding to a power transfer range for the power transfer signal; a response generator for generating a response message in response to the first message, the response comprising an indication of a property of the first message; and a second communication unit for transmitting the response message to the power transmitter over a second communication link not using the second communication coil, the second communication link having a range exceeding the range of the first communication link.

According to an aspect of the invention there is provided method of operation for a wireless power transfer system, the method comprising: a power transmitter performing the steps of: a power transfer coil transferring power to a power receiver via a power transfer signal, communicating messages to the power receiver on a first communication link using a first communication coil being at least one of the transmit power transfer coil and a transmit communication coil proximal to the transmit power transfer coil, the messages including a first message, the first communication link having a range corresponding to a power transfer range for the power transfer signal; receiving data from the power receiver on a second communication link, the second communication link not using the first communication coil and having a range exceeding the range of the first communication link; and a power receiver performing the steps of: a receive power transfer coil receiving the power transfer signal, providing power to a load from the power transfer signal, receiving messages from the power transmitter on the first communication link using a second communication coil being at least one of the receive power transfer coil and a receive communication coil proximal to the receive power transfer coil, the messages including the first message, generating a response message to the first message, the response comprising a first property indication of a property of the first message, transmitting the response message to the power transmitter over the second communication link not using the second communication coil; and the power transmitter further performs the steps of: determining an expected response message to the first message, the expected response message comprising an expected property indication for the property of the first message; generating a confirmation indication indicative of whether a message is received on the second communication link corresponding to the expected response message, the confirmation indication being indicative of whether the property indication matches the expected property indication; and controlling a power level of the power transfer signal in response to the confirmation indication.

According to an aspect of the invention there is provided method of operation for a power transmitter of a wireless power transfer system, the method comprising: a power transfer coil transferring power to a power receiver via a power transfer signal; communicating messages to the power receiver on a first communication link using a first communication coil being at least one of the transmit power transfer coil and a transmit communication coil proximal to the transmit power transfer coil, the first communication link having a range corresponding to a power transfer range for the power transfer signal and the messages including a first message; receiving data from the power receiver on a second communication link, the second communication link not using the first communication coil and having a range exceeding the range of the first communication link; determining an expected response message to the first message, the expected response message comprising an expected property indication for a property of the first message; generating a confirmation indication indicative of whether a message is received on the second communication link corresponding to the expected response message and comprising a property indication corresponding to the expected property indication; and controlling a power level of the power transfer signal in response to the confirmation indication.

According to an aspect of the invention there is provided method of operation for a power receiver of a wireless power transfer system, the method comprising: a receive power transfer coil receiving a power transfer signal from a power transmitter; providing power to a load from the power transfer signal; receiving messages from the power transmitter on a first communication link using a second communication coil being at least one of the receive power transfer coil and a receive communication coil proximal to the receive power transfer coil, the messages including a first message from the power transmitter and the first communication link having a range corresponding to a power transfer range for the power transfer signal; generating a response message in response to the first message, the response comprising an indication of a property of the first message; and transmitting the response message to the power transmitter over a second communication link not using the second communication coil, the second communication link having a range exceeding the range of the first communication link.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which

FIG. 8 illustrates an example of a message format for a response message from a power receiver of the power transfer system of FIG. 1;

DETAILED DESCRIPTION OF SOME EMBODIMENTS OF THE INVENTION

The following description focuses on embodiments of the invention applicable to a Qi power transfer system but it will be appreciated that the invention is not limited to this application but may be applied to many other power transfer systems.

Figure 1:
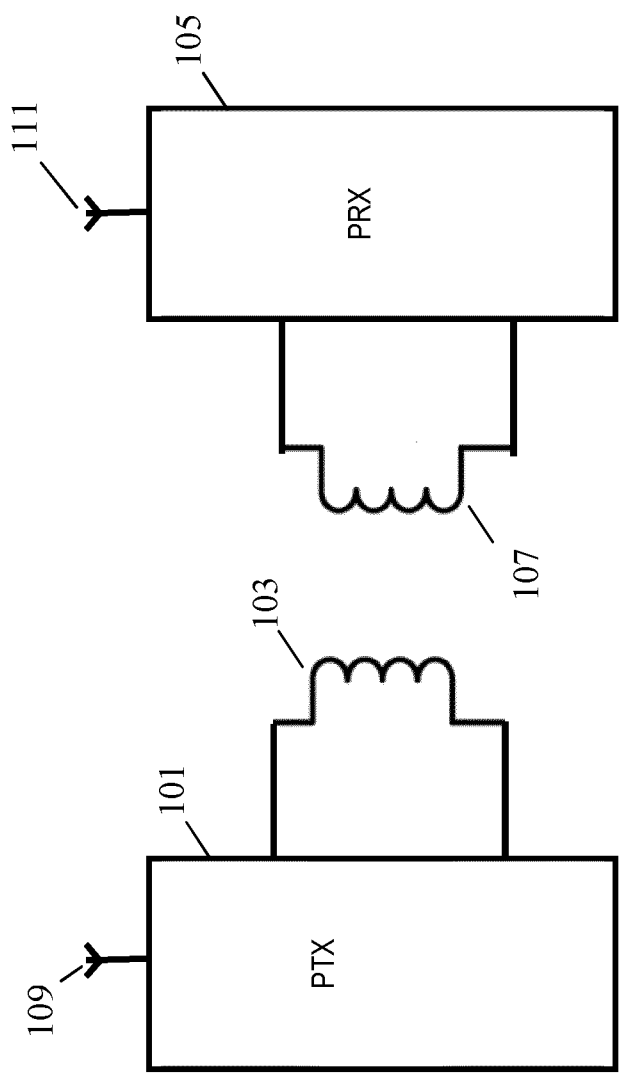
FIG. 1 illustrates an example of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmit power transfer coil/inductor which henceforth will be referred to as the transmitter coil 103. The system further comprises a power receiver 105 which includes (or is coupled to) a receive power transfer coil/inductor which henceforth will be referred to as the receiver coil 107.

The system provides a wireless inductive power transfer from the power transmitter 101 to the power receiver 105. Specifically, the power transmitter 101 generates a power transfer signal which is propagated as a magnetic flux by the transmitter coil 103. The power transfer signal may typically have a frequency between around 20 kHz to 200 kHz. The transmitter coil 103 and the receiver coil 107 are loosely coupled and thus the receiver coil picks up (at least part of) the power transfer signal from the power transmitter 101. Thus, the power is transferred from the power transmitter 101 to the power receiver 105 via a wireless inductive coupling from the transmitter coil 103 to the receiver coil 107. The term power transfer signal is mainly used to refer to the inductive signal between the transmitter coil 103 and the receiver coil 107 (the magnetic flux signal), but it will be appreciated that by equivalence it may also be considered and used as a reference to the electrical signal provided to the transmitter coil 103, or indeed to the electrical signal of the receiver coil 107.

In some embodiments, the receive power transfer coil may even be a receive power transfer entity which when exposed to the inductive power transfer signal is heated up due to the induced eddy currents or additionally by hysteresis losses due to ferromagnetic behavior. For example, the receive coil 107 may be an iron plate for an appliance that is inductively heated. Thus, in some embodiments, the receive coil 107 may be an electrically conductive element which is heated by induced eddy currents or additionally by hysteresis losses due to ferromagnetic behavior. In such an example, the receive coil 107 thus also inherently forms the load.

In the following, the operation of the power transmitter 101 and the power receiver 105 will be described with specific reference to an embodiment in accordance with the Qi standard (except for the herein described (or consequential) modifications and enhancements). In particular, the power transmitter 101 and the power receiver 105 may substantially be compatible with the Qi Specification version 1.0 or 1.1 (except for the herein described (or consequential) modifications and enhancements).

To control the power transfer, the system may proceed via different phases, in particular a selection phase, a ping phase, an identification and configuration phase, and a power transfer phase. More information can be found in chapter 5 of part 1 of the Qi wireless power specification.

Initially, the power transmitter 101 is in the selection phase wherein it merely monitors for the potential presence of a power receiver. The power transmitter 101 may use a variety of methods for this purpose, e.g. as described in the Qi wireless power specification. If such a potential presence is detected, the power transmitter 101 enters the ping phase wherein a power transfer signal is temporarily generated. The signal is known as a ping signal. The power receiver 105 can apply the received signal to power up its electronics. After receiving the power transfer signal, the power receiver 105 communicates an initial packet to the power transmitter 101. Specifically, a signal strength packet indicating the degree of coupling between power transmitter and power receiver is transmitted. More information can be found in chapter 6.3.1 of part 1 of the Qi wireless power specification. Thus, in the Ping phase it is determined whether a power receiver 105 is present at the interface of the power transmitter 101.

Upon receiving the signal strength message, the power transmitter 101 moves into the Identification & Configuration phase. In this phase, the power receiver 105 keeps its output load disconnected and in conventional Qi systems a power receiver 105 in this phase communicates to the power transmitter 101 using load modulation. In such systems, the power transmitter provides a power transfer signal of constant amplitude, frequency and phase for this purpose (with the exception of the change caused by load-modulation). The messages are used by the power transmitter 101 to configure itself as requested by the power receiver 105. The messages from the power receiver are not communicated continuously but are communicated in intervals.

Following the Identification and Configuration phase, the system moves on to the power transfer phase where the actual power transfer takes place. Specifically, after having communicated its power requirement, the power receiver 105 connects the output load and supplies it with the received power. The power receiver 105 monitors the output load and measures the control error between the actual value and the desired value of a certain operating point. It communicates such control errors to the power transmitter 101 at a minimum rate of e.g. every 250 ms to indicate these errors to the power transmitter 101 as well as the desire for a change, or no change, of the power transfer signal. Thus, in the power transfer phase, the power receiver 105 also communicates with the power transmitter.

The power transfer system of FIG. 1 utilizes communication between the power transmitter 101 and the power receiver 105.

An approach for communication from a power receiver to a power transmitter has been standardized in the Qi Specification version 1.0 and 1.1.

In accordance with this standard, a communication channel from the power receiver to the power transmitter is implemented using the power transfer signal as carrier. The power receiver modulates the load of the receiver coil. This results in corresponding variations in the power transfer signal at the power transmitter side. The load modulation may be detected by a change in the amplitude and/or phase of the transmitter coil current, or alternatively or additional by a change in the voltage of the transmitter coil. Based on this principle, the power receiver can modulate data which the power transmitter demodulates. This data is formatted in bytes and packets. More information can be found in the "System description, Wireless Power Transfer, Volume I: Low Power, Part 1: Interface Definition, Version 1.0 July 2010, published by the Wireless Power Consortium" available via http://www.wirelesspowerconsortium.com/downloads/wireless-power-specification-part-1.html, also called the Qi wireless power specification, in particular chapter 6: Communications Interface.

It is noted that the Qi wireless power specification versions 1.0 and 1.1 define only communication from the power receiver to the power transmitter, i.e. it defines only a unidirectional communication.

The system of FIG. 1 uses a different approach to communication than that disclosed in the Qi wireless power specification versions 1.0 and 1.1. However, it will be appreciated that this different approach to communication may be used together with other communication approaches, including the communication approach of the Qi wireless power specification versions 1.0 and 1.1. For example, for a Qi type system, the communication approach of Qi wireless power specification versions 1.0 and 1.1 may be used for all communication that is specified to be performed by the Qi wireless power specification versions 1.0 and 1.1, but with additional communication being supported by the different approach described in the following. Also, it will be appreciated that the system may communicate in accordance with the Qi wireless power specification versions 1.0 and 1.1 in some time intervals but not in others. For example, it may use standard load modulation during the Identification and Configuration phase where the power transfer signal and external loads may be constant but not during the power transfer phase where this is not the case.

In the system of FIG. 1, communication between the power receiver 105 and power transmitter 101 is enhanced with respect to the standardized communication of Qi wireless power specification versions 1.0 and 1.1.

Firstly, the system supports communication of messages from the power transmitter 101 to the power receiver 105, and in particular allows the power transmitter 101 to transmit data to the power receiver 105.

In the example of FIG. 1, this is achieved by the power transmitter 101 modulating the power transfer signal corresponding to the message being transmitted. The approach of the system of FIG. 1 can specifically involve a modulation by the power transmitter 101 of the amplitude or frequency of the time varying magnetic field which is used to transfer power to the power receiver device, i.e. of the power transfer signal. Thus, bidirectional communication has been introduced by the power transmitter 101 being able to modulate the power signal in order to communicate messages to the power receiver 105. The power transmitter 101 specifically introduces a deviation of the power signal relative to an unmodulated power signal where the deviation is indicative of the data being communicated. This deviation can then be detected by the power receiver 105 and used to demodulate/decode the data message The power transmitter 101 may specifically modulate the power transfer signal by changing the amplitude, frequency, or phase of the power signal, i.e. it may typically use AM, FM and/or PM modulation. As an example, the power transfer signal may be overlaid by a relatively short amplitude variation sequence with an average value of zero and a pattern indicative of the data being transmitted. E.g. the resulting modulated power transfer signal may have an amplitude given as:

$$P_m(t)=m(t)+P_u(t)$$

where m(t) is the modulation sequence and $P_u(t)$ is the unmodulated power transfer signal. It will be appreciated that in other embodiments, a multiplicative modulation may be applied using a modulation signal with an average signal level of e.g. unity.

The power receiver 105 is arranged to detect the modulation and thus recover the transmitted data. For example, the power transfer signal from the receiver coil 107 may be rectified by a rectifier (typically a bridge rectifier) and the resulting signal may be smoothed by a capacitor resulting in a smoothed but variable DC voltage, where the variations correspond to the amplitude variations of the modulation (as well as potentially noise). The variations may be compared to the modulation patterns and the closest match identified. The data corresponding to this pattern is then decoded as the data transmitted by power transmitter 101.

The system thus implements a first communication link in the form of a forward communication link supporting communication of messages for the power transmitter 101 to the power receiver 105. In the example, the forward communication link is implemented by modulation of the power transfer signal, i.e. data of forward link messages from the power transmitter 101 to the power receiver 105 can be communicated by modulating the data onto the power transfer signal. As the data is carried by the power transfer signal itself, the range of the communication on the forward communication link inherently corresponds to the range of the power transfer signal (the power transfer range), and typically is inherently substantially the same as the power transfer range.

The range of a communication link may be considered to correspond to an expected range for which the communication range is considered reliable. E.g., it may correspond to the range for which a bit error rate is below e.g. 0.01, 0.001 or 0.0001.

Thus, the use of the power transfer signal for communication provides a correspondence between the power transfer and the forward communication link such that the ability to do one (i.e. transfer power or communicate) implies the ability to also do the other.

In particular, such an approach may ensure that power receivers that can be powered by the power transfer signal will also receive the forward communication link messages from the power transmitter 101. Correspondingly, it can also be assumed that power receivers that are sufficiently close to receive the forward communication link messages are also capable of being powered by the power transmitter 101.

Thus, the feature allows for a close correlation between the power transfer and the forward communication operations. In most embodiments and scenarios, it can be assumed that if power transfer is feasible then so is forward link communication, and vice versa. Similarly, the restricted range of the forward communication link typically means that it can be assumed that if power transfer is not possible then neither is forward communication, and vice versa.

The limited range of the forward communication ensures that the forward link messages can be received by power receivers that are supported by the power transmitter 101, and typically only by power receivers that are supported by the power transmitter 101. Thus, the limited range may be used to reduce the possibility of the forward link messages being received by other power receivers, such as e.g. by a power receiver that is powered by another power transmitter.

It will be appreciated that any suitable modulation may be used, and that a person skilled in the art will be aware of a range of suitable modulation techniques. In most embodiments, the required data communication capacity is very low, and a low complexity modulation function can be used.

Another difference of the system of FIG. 1 to a conventional Qi system is that rather than exclusively use load modulation for communications from the power receiver 105 to the power transmitter 101, the systems makes use of a separate second communication link (henceforth referred to as the reverse communication link) which does not use either the transmitter coil 103 or the receiver coil 107. Indeed, in the example of FIG. 2, the reverse communication link uses radio communication rather than signals between loosely coupled coils. Specifically, the communication is not implemented by any coils coupling as a loose transformer but rather uses antennas. In particular, the power transmitter 101 includes a receive antenna 109 which can receive radio signals transmitted from a transmit antenna 111 of the power receiver 105.

Although primarily intended as reverse communication, the communication functionality implementing the second communication link may also be used for additional forward communication. For example, the reverse communication link may be a Bluetooth communication link, and the Bluetooth functionality may also be used to communicate additional data from the power transmitter 101 to the power receiver 105. This could be useful when higher data rates are needed for other applications (user interface, software updates, file transfer, etc.)

The reverse communication link thus provides a link from the power receiver 105 to the power transmitter 101 which uses a communication approach that does not rely or use the transmit coil 103, the receive coil 107, or indeed the power transfer signal. Rather, in most embodiments, the reverse communication link is completely independent of the power transfer signal and is not affected by any dynamic changes in the characteristics of this. The reverse communication link is thus significantly decoupled from the power transfer signal, and is specifically not affected by the load variations at the power receiver 105. Accordingly, the reverse communication link may relative to load modulation provide improved communication from the power receiver 105 to the power receiver 105, and may in particular provide a more reliable communication in situations where the load of the power receiver 105 is a variable load.

Indeed, in order to prevent interference to the communication from changes in the power transfer signal, a communication link may be used which is physically uncoupled as much as possible from the power channel. For example, an RF signal with a frequency that is much higher than that of the power signal together with an antenna designed specifically for this high frequency will provide sufficient decoupling between the power signal and the reverse communication link from the power receiver 105 to the power transmitter 101. Further advantages of a separate communication link (and specifically of using a higher carrier frequency) include that the communication channel can support a higher data rate and can carry more redundant information which can be used to increase the reliability (e.g. by using error correcting coding).

In addition to not using the power transfer signal, the transmitter coil 103 or the receive coil 107, the second/reverse communication link also differs from the first/forward communication link by having a range that exceeds that of the first/reverse communication link. Typically, the range of the reverse communication link is at least two and often five or ten times higher than the range of the forward communication link and the range of the power transfer. In particular, in many embodiments, the range of the power transfer and forward communication link may be less than 30 cm, and often less than 20 cm, or even 10 cm. However, the communication range for the second communication link may typically be substantially larger, and in most embodiments may be at least 50 cm, or indeed may exceed 1 meter or more.

This difference of ranges is typically a consequence of the different communication technologies that are used. In particular, the forward communication link may be implemented by modulating the power transfer signal as previously described. Accordingly, the range of the forward communication link is restricted to be commensurate and comparable to that of the power transfer. It will be appreciated that even if the ranges for power transfer and forward link communication is not exactly the same, the ranges will typically be very similar. Indeed, in most embodiments, the difference may be less than, say 50%. Thus, the ranges may be considered to correspond to each other, if they differ by no more than, say, 25%, 50% or 100% of the power transfer range.

However, in order to avoid the problems associated with load modulation (such as the noise introduced by varying loading of the power receiver), the reverse communication may use a completely separate communication system, such as e.g. Bluetooth. A consequence of using a different communication approach is that the communication range may be substantially different. For example, the range for Bluetooth communication may be several meters or even tens of meters.

The use of a reverse communication link that is independent of the receive coil 107 and the transmit coil 103 may also have some disadvantages. In particular, communication by load modulation inherently ensures that there is a very high probability that data communicated is between the correct power receiver 105 and power transmitter 101, i.e. the power transmitter 101 can reliably assume that the received data can be used to control the power transfer operation. However, the Inventors have realized that when a separate reverse communication link that is independent of the power transfer signal is used, there is a risk that the data transmitted from the power receiver 105 may not be received by the power transmitter 101 that delivers power to power receiver 105 or may be received by the power transmitter 101 that does not deliver power to the power receiver 105. Similarly, there is a risk that data received by the power transmitter 101 has not originated from the expected power receiver 105.

The issue may be particularly significant for situation where a plurality of power transmitters is positioned within a limited area and may simultaneously transfer power to a plurality of power receivers may take place.

The issue may also be particularly significant for power transmitters that include a plurality of transmit coils and which are capable of simultaneously supporting a plurality of power transfers.

For example, the use of a separate RF communication link for the reverse communication link does not require that the power receiver 105 is positioned correctly for the communication to be carried out. Specifically, the fact that successful communication is possible using the separate reverse communication link will typically not guarantee that the receive coil 107 is positioned sufficiently close to the transmit coil 103. If a power receiver controls a power transmitter via such communication channel, the system can therefore not be certain that the receive coil is positioned sufficiently close to the primary coil (and thus the coupling between the receive coil and the transmit coil may be very low). It is possible that the power receiver keeps requesting the power transmitter to power up until the provided power is sufficiently high that the power receiver receives sufficient power even with the current inefficient coupling. However, this may require a very strong magnetic field to be induced and this could lead to unexpected and undesirable exposure of the user or metal objects to the magnetic field generated by the power transmitter.

The power transmitter and power receiver may include additional functionality for verifying and checking the position of the power receiver but such additional functionality will typically add complexity and cost.

Also, in particular the simultaneous use of multiple appliances with individual power receivers could lead to the situation where a first power receiver coupled to a first power transmitter interferes with a second power receiver coupled to a second power transmitter. The control signals of the first power receiver could be picked up by the second power transmitter or vice versa. This could for example result in the second power transmitter being controlled to generate a high magnetic field that is not appropriate for the second power receiver. For example, if the first power receiver detects that the level of the power signal should be increased, it may request a power up. However, due to the extended range of the reverse communication link, this request could be received by the second power transmitter rather than the first power transmitter and will then result in the power signal provided to the second power receiver being increased. The first power receiver will still detect that the level of the power signal is too low (as it has not been changed) and will continue to request a power up. Thus, the second power transmitter will continue to increase the power level. This continuous power up could lead to damage, excessive heat generation, and in general to an undesirable and even potentially unsafe situation for the second power receiver and the associated appliance.

As a specific exemplary scenario to illustrate the issue, a user may put a kettle on top of a first power transmitter in the kitchen. The first power transmitter may detect that an object is placed on its power transfer interface and it may provide a power transfer signal with low power to the kettle in order start up its electronics. The kettle sends information via the RF reverse communication link to the power transmitter in order to initiate and control the power transmitter to provide power. After some time, the user may decide to put a pan on the first power transmitter and accordingly he may move the kettle to a second power transmitter near the first power transmitter. The second power transmitter detects the kettle and will under control of the kettle transfer power to the kettle. The first power transmitter may detect the pan, but will still receive the control data from the kettle. The first power transmitter will therefore provide power to the pan but the power signal will be controlled by the kettle resulting in an unexpected heating of the pan. The user will typically not be aware of the situation and may e.g. touch the pan which may be inappropriately hot.

As another example, the same scenario may be encountered but with the addition of a non-heat resistive countertop. The kettle may constructed such that it does not heat the surface on which it is positioned even when the water in the kettle has reached boiling point. The pan could be a conventional pan suitable for induction cooking, but only intended to be used on a ceramic glass plate. In this situation, the pan could damage the non-heat resistive countertop, because it does not contain any means to limit the dissipation of the energy when the first power transmitter is still under control of the kettle while the pan is positioned on the first power transmitter.

Figure 2:
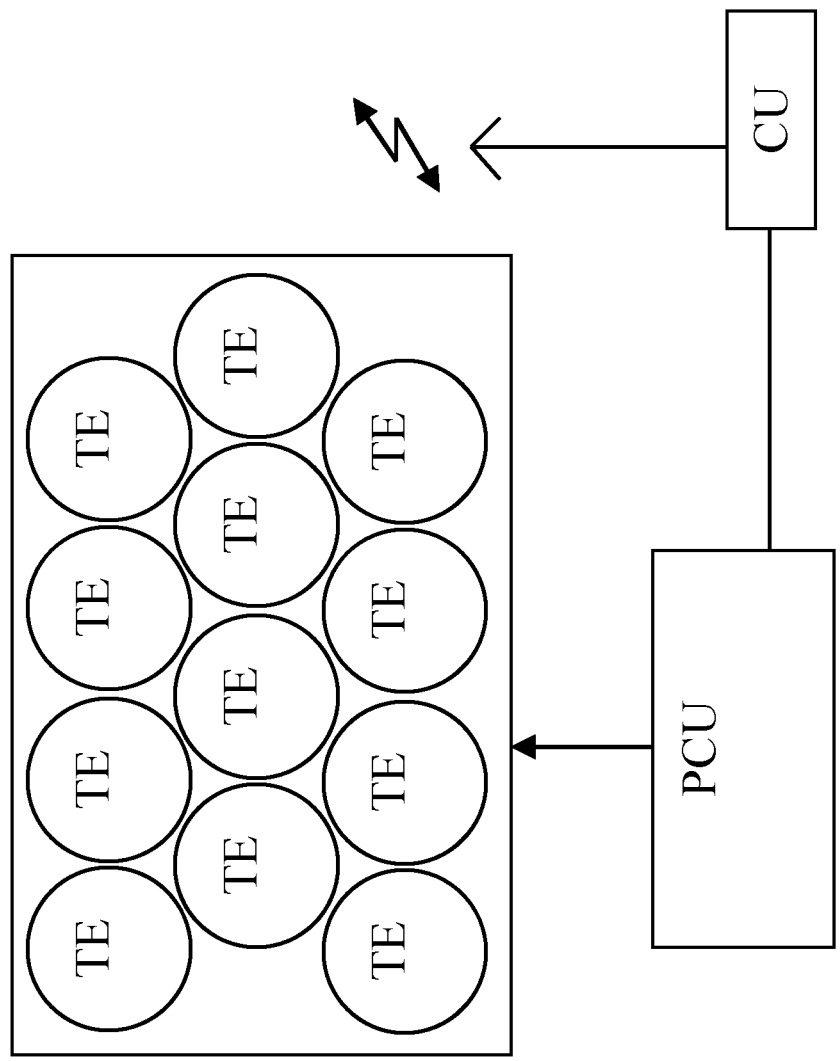
FIG. 2 illustrates an example of a power transmitter for the power transfer system of FIG. 1.

Not only for situations where a plurality of power transmitters is positioned within a limited area and simultaneously power transfer to a plurality of power receivers may take place, but also in embodiments where the power transmitter may comprise a plurality of transmit coils, the issue may be particularly significant. For example, as illustrated in FIG. 2, a power transmitter may comprise a power controller PCU which controls a plurality of transmit elements TE each comprising a transmit coil. At the same time, a separate communication unit CU may receive data from a separate RF reverse communication link. In such a scenario, a first power receiver may be positioned on a first of the transmit elements/coils TE. For example, a mobile phone may be positioned on the transmit coil array, and a power transfer to the mobile phone may start. The mobile phone may transmit control data back to the power transmitter using the RF reverse communication link, and the power signal of the first transmit coil TE may be arranged in accordance. The user may now desire to charge a second mobile. He may move the first mobile phone slightly to one side in order to make room for the new phone which may result in the first mobile phone now being positioned over a different transmit coil, such as e.g. over a neighboring transmit coil. However, this may not be detected by the system and indeed the reverse communication link from the first mobile phone will still work. The first mobile phone will request power ups to compensate for the low coupling resulting in a very large magnetic field potentially being generated by the first transmit coil. Indeed, in many scenarios, the second mobile phone could potentially be positioned on top of the first transmit coil and it would consequently experience the high magnetic field without any chance of reducing it. Thus, the control of the power transfer may effectively be lost, and indeed in some scenarios the power transfer for one mobile may be controlled by the other and vice versa.

In the system of FIG. 1, a separate reverse communication link is used which may be completely decoupled from and independent of the power transfer. Thus, the system uses asymmetric communication wherein the forward communication is closely linked to the power transfer by having a corresponding range whereas the reverse communication may be completely different and specifically has a communication range that may substantially exceed that of the power transfer and of the forward communication.

Accordingly, the system includes functionality that may typically reduce the risks of issues such as those described above, and which may accordingly provide a more reliable and improved operation.

In particular, the system is arranged to establish a relation or association between the forward communication link from power transmitter 101 to power receiver 105 using the power transfer signal, and a fully separated reverse communication link from the power receiver 105 to the power transmitter 101. This relation is used to ensure that the power transmitter 101 is indeed controlled by the expected power receiver 105, i.e. that the power transfer is being controlled by the power receiver 105 receiving the power.

The system uses an approach wherein a first message is transmitted from the power transmitter 101 using the forward communication link. When receiving this first message, the power receiver 105 proceeds to generate a response message which it transmits back to the power transmitter 101 using the reverse communication link. The response message is generated to include a property for the first message. When the power transmitter 101 receives the response message it proceeds to determine whether the received response message corresponds to the message that it would expect from the power receiver 105 in response to the first message. Specifically, it can proceed to check whether the property indicated in the response message indeed corresponds to a property of the first message.

Accordingly, in this way the power transmitter 101 can determine with a very high probability whether the received message is indeed from power receiver that has received the first message, i.e. whether it is from the desired power receiver, or not. As the range of the forward communication link corresponds to that of the power transfer, the first message will only be received by power receivers that are or can be provided with power. Thus, only such a power receiver will be able to generate a response message that directly comprises an indication of a property of the first message. Accordingly, if the received indication matches the expected indication, the system can safely assume that indeed the communication is from a desired power receiver and not from any other power receiver, i.e. it can be assured that the message is from a power receiver sufficiently close to be powered by the power transmitter 101 and is not from e.g. a power receiver powered by a close by power transmitter but coincidentally within range of the power transmitter 101 as well.

The approach thus provides a feedback and close association between the forward communication link and the reverse communication link. In particular, the approach uses a response message which reflects a property of a forward message to provide proof that the communication is from a power receiver that can indeed receive forward communications. Accordingly, the approach can be used to differentiate between power receivers that are sufficiently close to be powered by the power transmitter and power receivers that are within range of the second communication link but not sufficiently close to be powered. Thus, the approach can address problems associated with using a communication approach with a substantially higher range for the second communication link. Indeed, the approach may ensure that the effective communication range of the reverse communication link is reduced to that of the forward communication link since messages received from power receivers too far away from receiving the first message can be detected and ignored.

Furthermore, the response message is not merely a message that is related to the first message, or even just a message which is transmitted as a consequence of the first message, but explicitly includes an indication of a property of the first message. Thus, the response message explicitly comprises e.g. data which describes a property of the first message. It thus provides a very reliable and secure means for the system to effectively check whether received messages are from the desired power receiver.

As a low complexity example, the power transmitter 101 may generate a message which is transmitted from the power transmitter 101 to the power receiver 105 on the forward communication link using the power transfer signal. For example, a simple message may be communicated which does not contain any data. As a low complexity, a short sequence of predetermined small amplitude variations may be added to the power transfer signal at the receiving end. This sequence of variations may be detected by the power receiver 105 which in response immediately sends a message to the power transmitter 101 over the reverse communication link.

The response message may for example include an indication of the frequency or of the amplitude pattern of the received message. The power transmitter 101 can then evaluate the received response message to determine whether the indicated frequency or amplitude variation indeed matches that of the transmitter first message. If so, the power transmitter 101 determines that the power receiver from which the response message is received is indeed one that is sufficiently close to receive the first message, and thus sufficiently close to be powered by the power transfer signal.

The receipt of the response message thus indicates to the power transmitter 101 that the data received on the reverse communication link is indeed from the power receiver 105 receiving the power transfer signal. Thus, if the power receiver 105 is e.g. moved to a different transmit coil and receives a different power transfer signal, it will not detect the initial message and will not transmit the response message. Accordingly, improved reliability can be achieved.

Although such a low complexity query and confirmation approach may be used in some embodiments, scenarios may exist in which the resulting security is unlikely to be considered sufficient. Therefore, in many embodiments, the forward message from the power transmitter 101 to the power receiver 105 may contain variable data with the response message from the power receiver 105 comprising variable response data generated from this forward variable data. Thus, the data of the first message is a property of the first message which is reflected by data in the response message, i.e. some of the data of the response message is dependent on the data of the first message.

The power transmitter 101 may accordingly detect whether the expected response data is received back from the power receiver 105 over the reverse communication link. If so, it proceeds to control the power transfer signal in response to the data over the reverse communication link and otherwise it may reduce the power level, e.g. by restricting it to a safe level or by completely terminating the power transfer.

In many embodiments, the response data may simply be the same as the data received by the power receiver 105 from the power transmitter 101. Thus, the power transmitter 101 may simply detect whether the data received over the reverse communication link is indeed the same as that which was transmitted over the forward communication link, i.e. over the power transfer signal. Thus, in many embodiments, the property of the first message which is reported back to the power transmitter 101 is some or all of the data of the first message. The indication may specifically be the data itself, i.e. the response message may simply be generated to include the same data. In other embodiments, the data may be processed or condensed. For example, a hash or a checksum for the data received in the first message may be generated and included in the response message. The data may specifically be power transmitter indication data.

As will described further later, the data may specifically include identification data for the power transmitter 101 or for the individual transmit coil 103, or may e.g. include a time stamp and/or message identity.

Figure 3:
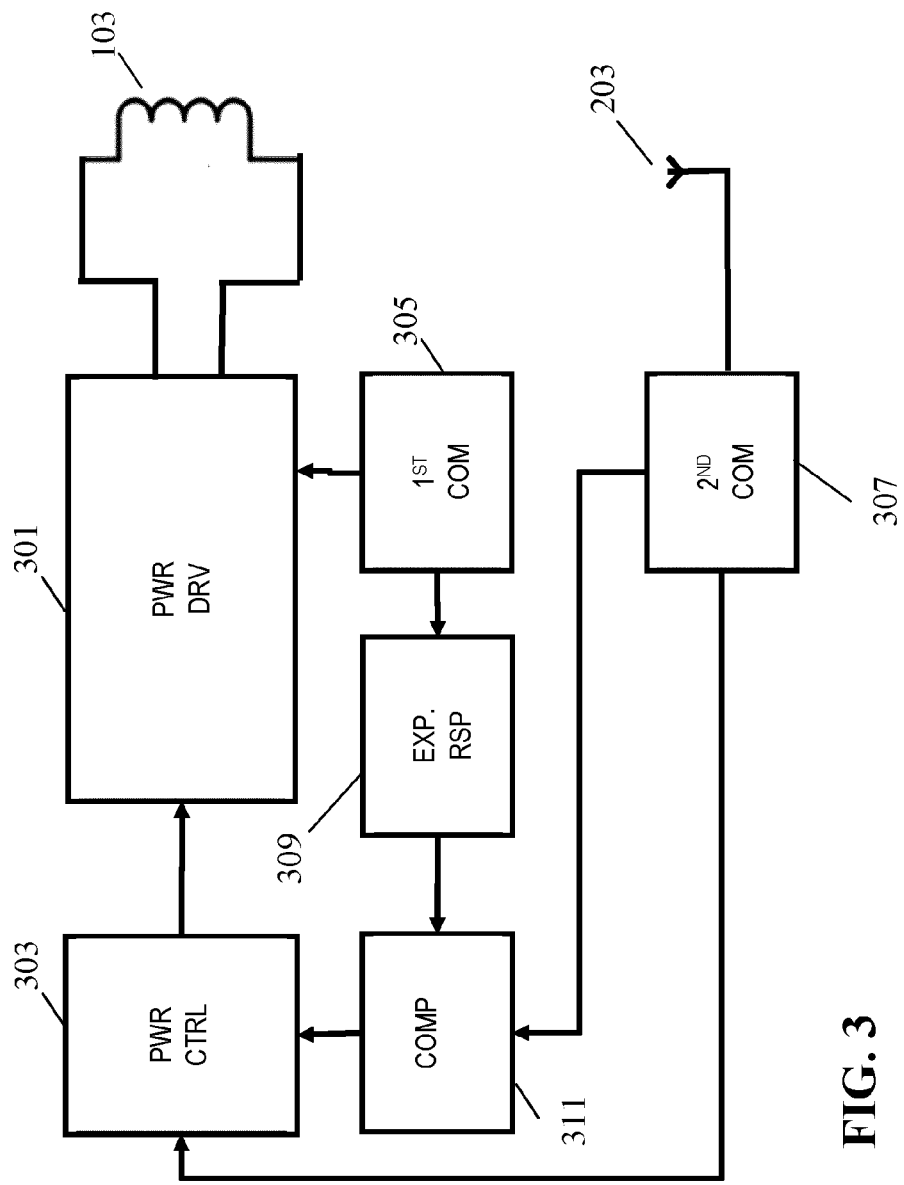
FIG. 3 illustrates an example of elements of a power transmitter for the power transfer system of FIG. 1.
Figure 4:
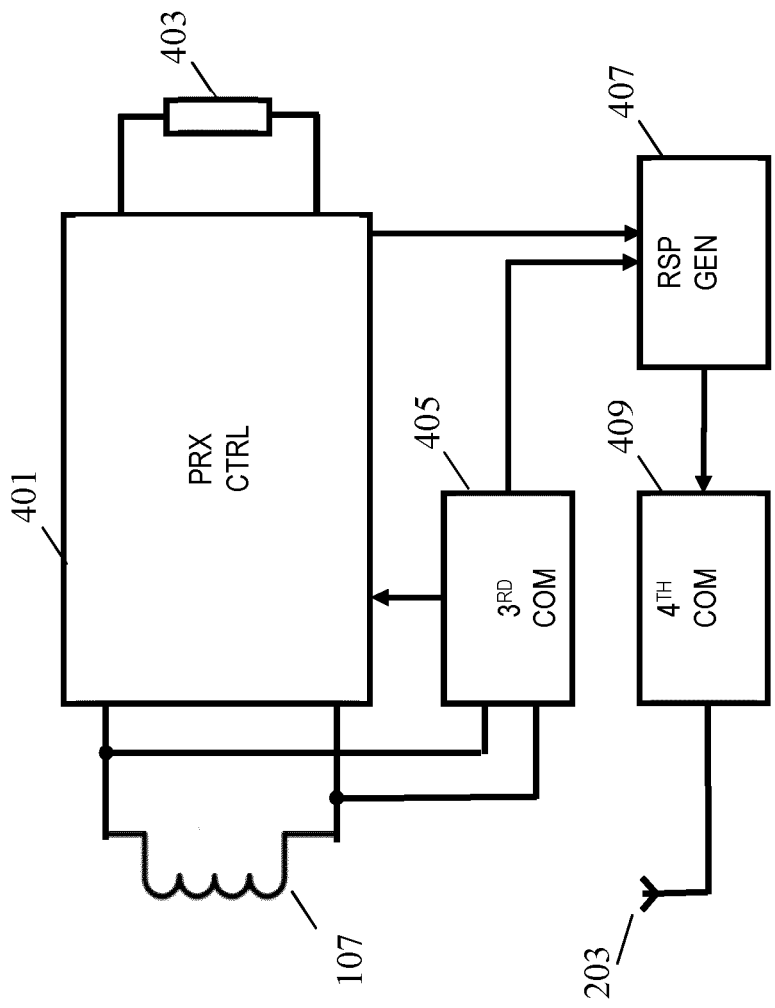
FIG. 4 illustrates an example of elements of a power receiver for the power transfer system of FIG. 1.

FIG. 3 illustrates elements of the power transmitter 101 of FIG. 1 in more detail and FIG. 4 illustrates elements of the power receiver 105 of FIG. 1 in more detail.

The power transmitter 101 comprises the transmit coil 103 which is coupled to a driver 301 that is arranged to generate the drive signal of the transmit coil 103, and thus is arranged to generate the drive signal which is translated into the inductive power transfer signal. The driver 301 is arranged to generate an AC signal with a desired power level which is fed to the transmit coil 103 to generate the power transfer signal. It will be appreciated that the driver 301 may comprise suitable functionality for generating the drive signal as will be well known to the person skilled in the art. For example, the driver 301 may comprise an inverter for converting a DC power supply signal into an AC signal of a suitable frequency (typically around 50-200 kHz) for the power transfer. It will also be appreciated that the driver 301 may comprise suitable control functionality for operating the different phases of the power transfer system. In many cases, the driver 301 will contain one or more capacitors in order to realize a resonance circuit with the power coil 103 for a chosen frequency.

The driver 301 is coupled to a power controller 303 which is arranged to control the power of the power signal. Specifically, the power controller 303 may generate a control signal which is fed to the driver 301 and which indicates the power level for the drive signal. The driver 301 can then scale the drive signal to have a corresponding amplitude.

The power transmitter 101 furthermore comprises a first communication unit 305 which is arranged to communicate data to the power receiver 105 on a forward communication link which uses a first communication inductor which in the example of FIG. 1 is the transmit coil 103.

The first communication unit 305 is coupled to the driver 301 and may specifically modulate the power transfer signal so as to communicate a message to the power receiver 105. For example, the power transmitter 101 may generate a suitable modulation signal that can be added to the amplitude of the power transfer signal (in which case the modulation signal will typically be small compared to the amplitude of the power transfer signal) or which can be multiplied by the power transfer signal (in which case the modulation signal will typically correspond to small variations from a unity gain).

The first communication unit 305 may thus transmit one or more messages to the power receiver 105 by modulating the power transfer signal. For example, data may be communicated by using predetermined amplitude variations where the different possible variations are associated with different data.

Specifically, the first communication unit 305 may transmit a forward message to the power receiver 105 with the power receiver 105 being expected to respond by transmitting a response message back to the power transmitter 101 to confirm that the reverse communication link is indeed a link with the power receiver 105 that is taking part in the power transfer.

In order to receive data from the power receiver 105 over the reverse communication link, the power transmitter 101 furthermore comprises a second communication unit 307 which is coupled to the receive antenna 203. The reverse communication link is thus based on the use of a receive antenna 203 rather than on receiving any signal view the transmitter coil 103. The reverse communication link uses a different communication approach than used for the forward communication link.

The power receiver 105 comprises a power transfer controller 401 which is coupled to the receive coil 107 and which receives the power transfer signal. The power transfer controller 401 is further coupled to a load 403 and is capable of receiving the power transfer signal and generating a suitable power supply signal for the load. The power transfer controller 401 may for example comprise a (full bridge) receiver, smoothing circuitry and voltage or power control circuitry as will be well known to the skilled person. In many cases, the power receiver contains one or more capacitors to realize a resonance circuitry with the receiver coil 107 for a chosen frequency.

The power transfer controller 401 is furthermore capable of controlling the power receiver 105 and specifically of supporting the transfer function operation including supporting the different phases of a Qi power transfer.

The power receiver 105 further comprises a third communication unit 405 which is arranged to receive messages from the power transmitter 101 on the communication link which uses the power transfer signal, i.e. the third communication unit 405 can receive the messages transmitted by the first communication unit 305 on the forward communication link. As the forward communication link uses the power transfer signal it inherently has substantially the same range as the power transfer range.

The third communication unit 405 thus receives messages using a communication link that in the example is based on the receive coil 107. The third communication unit 405 may specifically detect amplitude/frequency/phase variations of the power transfer signal and compare these to predetermined sequences that may be introduced by the first communication unit 305. If a match is found, the data corresponding to this match is considered to be received.

Thus, the first communication unit 305 may communicate data to the third communication unit 405 by modulating the data onto the power transfer signal which the third communication unit 405 may demodulate to recover the data. It will be appreciated that any suitable modulation approach may be used and that the communication may further use other communication techniques such as error correcting coding etc.

The power receiver 105 furthermore comprises a response generator 407 which is coupled to the third communication unit 405 and which is fed the received data. In the example where the power transmitter 101 merely transmits a predetermined inquiry message with no data, the response generator 407 may merely be fed an indication that the inquiry message has been received as well as e.g. a frequency or other property for the forward message.

The response generator 407 is arranged to generate a response message to the forward message. In the example of the predetermined inquiry message, the response message may for example be the frequency or amplitude variation of the power transfer signal.

However, in most embodiments, the response generator will generate response data in response to the received data. Thus, the property of the forward message which is indicated by the response message is some or all of the data of the forward message. In many embodiments, the response generator 407 may simply generate the response data to be equal to (at least some of) the received data. For example, if an identity and a time stamp is received in the forward message, the response generator 407 may simply copy this data to the response message.

In other embodiments, the response generator 407 may generate the response data in accordance with a suitable algorithm, such as for example an approach for determining a hash or a checksum from some or all of the data of the forward message.

In some embodiments, the response generator 407 may also include response data reflecting local characteristics. For example, in some scenarios, the response generator 407 may in response to an inquiry message generate a response message which comprises an identity of the power receiver 105 and/or a locally generated time stamp.

The response generator may include data generated by the power transfer controller 401. The response generator 407 may respond with multiple response messages on an inquiry message, and may for each response message include new data generated by the power transfer controller.

The response generator 407 is coupled to a fourth communication unit 409 which is arranged to communicate the response message to the power transmitter 101 over the reverse communication link.

As previously mentioned, the reverse communication link is a communication link that does not utilize the transmit coil 103, the receive coil 107 or indeed the power transfer signal. Rather, it is in the system of FIG. 1 a completely independent communication link which is not affected by variations in the characteristics of the power transfer, and specifically is not affected by the variations of the power transfer signal. Furthermore, the reverse communication link is supported by a communication approach which has a substantially larger range than the forward communication link, and which typically has a range of at least twice that of the forward communication link.

The reverse communication link may be separated from the power transfer signal by different properties. For example, they may be differentiated in the frequency domain with typically the reverse communication link using a communication frequency which is much higher than the frequency of the power transfer signal (e.g. at least 10 or even 100 times higher). In some embodiments, the separation may additionally or alternatively be achieved spatially, e.g. with the antennas being positioned relatively far from the power transfer coils. In yet other embodiments, the separation may alternatively or additionally be achieved by separation in the code domain, e.g. by the use of different spread spectrum codes (or the reverse communication link may use a spread spectrum communication whereas the forward communication link uses a simple amplitude modulation).

In some embodiments, the reverse communication link may be implemented by a generic and potentially standardized communication approach such as by a Bluetooth™, WI-Fi or NFC communication.

The second communication unit 307 will accordingly receive the response message from the fourth communication unit 409.

In addition, the reverse communication link will typically be used for communication of other data from the power receiver 105 to the power transmitter 101, such as control data and in particular power control data. Thus, the second communication unit 307 is coupled to the power controller 303 which is specifically fed the power control data required to dynamically adjust the power level of the power transfer signal as required by the power receiver 105. In many embodiments, the response message may be a shared message, such as e.g. a combined power control and response message.

The power transmitter 101 additionally includes a response processor 309 which is coupled to the first communication unit 305. The response processor 309 is arranged to determine an expected response message to the forward message. It further determines an expected property, i.e. it determines an expectation of the indication of a property in the response message.

In the example where predetermined forward messages with no variable data are used, the expected response message may include an indication of a property of the power transfer signal for this predetermined response message. In such a case, the response processor 309 may determine the value which it expects to see reported back in the response message. For example, if the forward message is transmitted by changing the frequency of the power transfer signal, and the response message provides an indication of the frequency of the power transfer signal, the response processor 309 may determine the expected value of the frequency reported in the response message.

However, in most embodiments, the forward and/or the response message will comprise variable data. Indeed, in most embodiments the response processor 309 is coupled to the first communication unit 305 and receives the first data which is included in the forward message from this. It then proceeds to determine what data should be expected in the response from the power receiver 105.

In many embodiments where the power receiver 105 merely copies the received data to the response message the expected response data may be identical to the transmitted data. In other embodiments, the expected response data may for example be generated in accordance with a suitable algorithm. E.g. the power receiver 105 may be required to apply a hash operation to the received data and to include the resulting hash in the response message. The response processor 309 may in such examples perform the same hash operation to generate the expected response data as the response generator 407.

In yet other embodiments, the expected response data may include data reflecting local data that is generated by the power receiver 105 without using data from the received forward message. For example, the response message may be arranged to include the identity of the power receiver 105 and possibly a locally generated time stamp. The response processor 309 may generate the expected response data to include expected values of such data. For example, the identity of the power receiver 105 may be exchanged during initialization of the power transfer, and the response processor 309 may accordingly use this information to determine the expected response. Similarly, a time synchronization between the power receiver 105 and the power transmitter 101 may have been performed at initialization of the power transfer, and based on this synchronization and a local timer, the response processor 309 may be arranged to calculate an expected time stamp for the response message.

It will be appreciated that the expected response data may be defined as e.g. specific data values or as ranges or intervals (or different options) of possible data. For example, the response processor 309 may generate a time stamp interval with the time stamp from the power receiver 105 being expected to fall within the interval.

The response processor 309 and the second communication unit 307 are coupled to a validity checker 311 which is further coupled to the power controller 303. The validity checker 311 is arranged to generate a confirmation indication which is indicative of whether a message is received on the second communication link corresponding to the expected response message.

Specifically, the validity checker 311 is provided with information that a message is received by the second communication unit 307. The power transmitter 101 will typically assume that messages and data received by the second communication unit 307 are indeed received from the reverse communication link with the power receiver 105, i.e. it is assumed that received messages originated with the power receiver 105. However, this cannot be guaranteed in all scenarios, and therefore the power transmitter 101 proceeds to evaluate whether the received (unknown) message (and potentially data) corresponds to that which is expected to be received from the power receiver 105. If the message received by the second communication unit 307 is indeed from the power receiver 105, it will be the expected response message. Specifically, the data of the received message should be from the fourth communication unit 409 and accordingly should match the expected response data.

Accordingly, the validity checker 311 proceeds to compare the received message/data to the expected response message/data. If they match, the confirmation indication may be set to indicate that the approach has confirmed that the power receiver from which the second communication unit 307 receives data is indeed the one involved in the power transfer, i.e. that it is the power receiver 105. This is referred to as a positive confirmation indication. If they do not match, the confirmation indication may be set to indicate that the approach has identified that the power receiver from which the second communication unit 307 receives data is not the one involved in the power transfer, i.e. it is not the power receiver 105. This is referred to as a negative confirmation indication. If no message is received within a given interval, a negative confirmation indication is also generated.

As a specific example, the confirmation indication may be set to a negative state or a positive state depending on whether the received response message/data matches the expected response message/data or not.

The confirmation indication is fed to the power controller 303 which proceeds to control the power level of the power transfer signal in response to the confirmation indication in response thereto. In particular, the power controller 303 may be arranged to reduce power if the confirmation indication indicates that there is no match, i.e. if a negative confirmation indication is generated.

E.g. if a positive confirmation indication is generated to indicate that the communication link is verified, the power controller 303 may proceed to perform a normal power transfer operation using the data received over the communication link (since this is confirmed to be from the power receiver 105 receiving the power transfer). However, if a negative confirmation indication is generated which indicates that the communication link is not verified, the power controller 303 may not proceed to perform a normal power transfer operation using the data received over the communication link (since this is not confirmed to be from the power receiver 105 receiving the power transfer). Instead, it may proceed to restrict the power of the power transfer signal to not exceed a threshold. The threshold may for example be selected such that the power transfer signal is unlikely to introduce any damage or undesired situation due to excessive magnetic fields. Specifically, the power level may be restricted to safe levels. Indeed, in some embodiments, the power may be reduced to zero, e.g. by the power controller 303 terminating the power transfer.

The system may accordingly establish a relationship or association between data communicated on the forward communication link and data communicated on the reverse communication link. This allows the power transmitter 101 to verify that the reverse communication link is established with the same power receiver as the forward communication link, and thus that the data received by the second communication unit 307 is indeed from the power receiver 105 involved in the power transfer.

The approach may provide improved reliability and may in particular prevent or reduce the risk of a number of undesired operational situations occurring. Specifically, it can reduce the risk of a power transfer being controlled by a power receiver which is not part of that specific power transfer but may be part of another power transfer.

The approach thus provides an efficient power transfer system wherein asymmetric communication is used, and specifically wherein a relatively long range communication approach can be used for communication from the power receiver 105 to the power transmitter 101 while at the same time providing the security and reliability resulting from having communication restricted to a very short range. Indeed, the forward communication is restricted to a range which corresponds to the power transfer range and the approach links the forward and reverse communications in such a way that the range for reverse messages is effectively restricted to the same range despite the reverse messages being communicated using a communication approach that has a substantially larger range.

The approach specifically links the forward and reverse communication links by introducing a link or association between at least one forward message and one reverse message. The response message is not merely any possible reverse message but is one that indicates a property of the first message, and thus it can only be transmitted by a power that can successfully receive the first message. The validity checker 311 accordingly detects whether the response message is from a power receiver that indeed has received the first message, and thus whether it is a message received from a power receiver than is sufficiently close to the power transmitter 101 to receive the first message.

The approach specifically ensures that messages transmitted by a power receiver which is powered by a nearby power transmitter will not be considered valid by the power transmitter 101. For example, a nearby power transmitter may transmit a power signal, such as for example a ping signal or a continuous power signal, which may power a power receiver that is positioned on this nearby power transmitter. This power receiver will accordingly transmit messages. For example, the presence of a ping power signal may result in the power receiver transmitting a reverse message. Due to the extended range of the reverse communication, this reverse message may be received by the power transmitter 101. However, the reverse message is not generated by a power receiver that is served by the power transmitter 101 but rather by one served by the nearby power transmitter. Accordingly, this power receiver cannot receive any forward message from the power transmitter 101 and therefore it does not (and cannot) determine any property of any message from the power transmitter 101, and furthermore it cannot include data generated from data of a message from the power transmitter 101. Accordingly, even if the power transmitter 101 happens to have transmitted a first message to which the received reverse message could possibly be a response message, the power transmitter 101 can easily determine that the received reverse message is not an appropriate response message to the power transmitter 101 and it will therefore ignore this message. Thus, even if the power receiver is within the communication range of the reverse communication link, the fact that it is outside of the communication range of the forward communication link prevents the received message from being considered to be a message for the power transmitter 101.

As a specific example, if two relatively close power transmitters happen to transmit ping signals at the same time, they may in accordance with the described approach each modulate the ping signals to include power transmitter identity data. A power receiver positioned on one of the power transmitters may then transmit a reverse message which includes a hash of the power transmitter identity of the ping signal it receives (or the identity itself). Accordingly, even of the reverse message that is transmitted from the power receiver can be received by both power transmitters, it will only be considered by the power transmitter that has a corresponding identity, i.e. it will only be considered by the power transmitter on which the power receiver is positioned. It will be appreciated that different data may be transmitted in the forward message and/or the response message in different embodiments and scenarios.

For example, in some embodiments, the forward message may include an identification of the power transmitter 101. This may allow the power receiver 105 to verify that the message is indeed received from the correct power transmitter 101. In addition, it may allow the power receiver 105 to detect if the power receiver 105 is moved to a different power transmitter.

In other embodiments, the forward message may alternatively or additionally include an identity of the specific transmit coil 103. This may in particular be advantageous if the power transmitter 101 comprises a plurality of transmit coils and in particular if it allows simultaneous power transfer to a plurality of power receivers coupled to different coils. The data may for example be used by the power receiver 105 to detect that it is moved from being supported by one transmit coil to being supported by another.

In some embodiments, the power receiver 105 may generate response data which directly corresponds to data received in the forward message. For example, the power receiver 105 may generate response data by copying the data from the forward message into the response message. The response message from the power receiver 105 may specifically comprise an identity of the power transmitter 101 or of a specific transmit coil of the power transmitter 101.

The power transmitter 101 may in such scenarios generate the expected response data as the same data transmitted in the forward message, i.e. as the identity of the transmitter and/or the transmitter coil. If the message received by the second communication unit 307 comprises data corresponding to the transmitted data, the confirmation indication is set indicate that the reverse communication link has been confirmed/verified. The approach may allow a large number of undesirable operational configurations (such as those outlined above) to be detected.

In many embodiments, it may be desirable to include a consideration of the temporal aspects in the verification of the reverse communication link. Specifically, it may in many embodiments be advantageous to require not only that the power transmitter 101 receives an expected response to the forward message but also that this is received within a given time window. Specifically, it may be advantageous that an appropriate response message is received within a given maximum allowable delay.

Thus, in some embodiments, the validity checker 311 may be arranged to determine a time delay from transmission of the forward message to receipt of the received message. The confirmation indication may then be set based on the time delay.

It will be appreciated that a specific value of the measured time delay need not be determined in many embodiments. Indeed, in some embodiments, it may simply be determined whether the time delay exceeds a given threshold or not, and the confirmation indication may be set to indicate this.

For example, the power transmitter 101 may transmit a predetermined forward message to the power receiver 105 and may then initialize the second communication unit 307 to monitor the reverse communication link. At the same time, the validity checker 311 may start a timer. If the second communication unit 307 detects that a (e.g. predetermined) response which matches an expected response from the power receiver 105 is received before the timer reaches a given value, the confirmation indication is set to indicate that the reverse communication link has been verified and that it has been confirmed that the second communication unit 307 is communicating with the power receiver 105 also involved in the power transfer, i.e. a positive confirmation indication is generated. The power controller 303 then proceeds to operate the power transfer based on control data received over the reverse communication link. However, if no response (or an invalid response) is received before the timer reaches a given value, the validity checker 311 sets the confirmation indication to indicate that the reverse communication link has not been verified and that it is not confirmed that the second communication unit 307 communicates with the power receiver 105 involved in the power transfer, i.e. a negative confirmation indication is generated. In response, the power controller 303 proceeds to restrict the power level of the power transfer signal to a relatively low value (say less than 5 W). Indeed, in some embodiments, it may simply terminate the power transfer (thereby setting the power of the power transfer signal to zero).

It will be appreciated that the power transmitter 101 may determine the timing of the response message in different ways in different embodiments.

For example, in some embodiments the forward message may comprise an indication of a transmit time for the first message. This may e.g. be used by the power receiver 105 to synchronize a local time base. When the power receiver 105 transmits the response message, it may include the current time according to this time base (which will then be synchronized with the time base of the power transmitter 101). The power transmitter 101 can then determine the delay based on knowledge of the original time of transmission and of the indication of the transmit time of the response message.

As another example, the transmit time indication may simply be copied into the response message. The power transmitter 101 may then determine the delay by subtracting the time of receiving the response message from the transmit time indicated in the forward message.

As yet another example, the transmit time indication of the forward message may simply be a message identity or a sequence number. Furthermore, when transmitting the forward message, the power transmitter 101 may store the time of transmission locally. The power transmitter 101 may copy the message identity or sequence number into the response message and when this is received by the power transmitter 101, it may proceed to retrieve the stored transmit time corresponding to this message identity or sequence number. The delay can then be determined from the current time and the retrieved transmit time.

An advantage of such approaches is that the time bases of the power transmitter 101 and the power receiver 105 need not be synchronized.

In some embodiments, the response message may be a message which is specifically generated when the forward message is generated. Thus, in some embodiments, the forward message causes the response message to be generated. However, in other embodiments, the response message may be a message which is generated anyway but which is modified to reflect the receipt of the forward message. It will also be appreciated that one forward message may result in a plurality of response messages being generated. For example, data from one forward message may be included in a plurality of messages transmitted back to the power transmitter 101 via the reverse communication link. Each of these messages may be considered a response message.

For example, the power receiver 105 may continuously transmit power control messages back to the power transmitter 101 in order to implement a power control loop. For example, during the power transfer phase it may be required that a power control message is transmitted at least every 200 msecs. In such a scenario, it may be required that each power control message comprises data from the forward message, such as e.g. a transmitter identity and/or message identity. If any of the power control messages is detected to not include the correct transmitter identity or message identity that was provided by the forward message, the power transmitter 101 may abandon the power transfer and restrict the power level. Thus, in such an embodiment, each power control message may be considered a response message.

The inclusion of an indication of a property of the first message in the response message and the checking of this by the power transmitter 101 may accordingly allow for a relaxed timing sensitivity, and indeed may in many embodiments remove any requirement for the response message to have any timing or sequence relationship with the first message.

For example, the power transmitter 101 may transmit a forward link message comprising the power transmitter identity. This may only be received by the power receiver 105 powered by the power transmitter 101. For all reverse link messages, the power transmitter 101 may check whether they include a hash of the power transmitter identity and ignore them otherwise. As the hash can only be provided by the power receiver 105 powered by the power transmitter 101, all messages received from other power receivers which happen to be within the reverse link communication range will automatically be ignored by the power transmitter 101. Such an effect would not be feasible if e.g. any message received within a given time interval following the transmission of the first message were to be considered to be from a supported power receiver.

In some embodiments, the verification of the link may only be performed e.g. at initialization of a power transfer, and in particular a forward message may only be communicated once. However, in many embodiments, it will be advantageous to repeat the process for example at regular time intervals.

Thus, in many embodiments, the power transmitter is arranged to repeatedly transmit forward messages, and may further be arranged to repeatedly generate confirmation indications that are indicative of whether appropriate response messages are received from the reverse communication link to these forward messages. The power transmitter 101 may further repeatedly control the power based on the repeated confirmation indication, and may specifically restrict the power or terminate power transfer if non-positive confirmation indications are received.

For example, the power transmitter 101 may at regular intervals transmit a forward message to the power receiver 103 on the forward communication link (or may e.g. transmit the forward messages continuously (i.e. back to back with essentially no pause between messages), especially when the forward communication link is very slow and therefore requiring considerable time to transmit each message). For each transmitted forward message, it may then determine whether a suitable response message is received within a given time interval. If so, the power transmitter 101 proceeds to perform power transfer based on the control data received over the reverse communication link. However, if no suitable response message is received, the power transmitter 101 proceeds to restrict the power of the power transfer signal to below a given threshold. The power transmitter 101 may in this scenario proceed to transmit the forward messages and if appropriate responses begin to be received, it may proceed to return to normal power operation. It will be appreciated that different criteria may be applied for deciding whether to restrict power or not based on the sequences of positive and negative confirmation indications. For example, power transfer may be terminated if one negative confirmation indication is received and only resumed after, say, five consecutive positive confirmation indications.

As an example, in some embodiments, each of the forward messages may comprise an indication of a transmit time for the message. The response generator 407 may in response to each forward message generate one or more response messages which includes the transmit time indication for the message. The validity checker 311 may generate confirmation indications for messages received over the reverse communication link in response to a comparison of the transmit time indication of each received message and an expected time indication for the received message. If the received messages does not correspond to expected response messages from the power transmitter 101 or are not received within a given time interval, a negative confirmation indication is generated. Otherwise, a positive confirmation indication is generated.

The use of repeated sequences of forward messages and response messages allows the system to continuously and dynamically verify that the reverse communication link is indeed with the intended power receiver 105. In particular, it allows the system to detect and follow changes in the charging configuration as and when they happen. For example, if a device comprising a power receiver 105 is moved from one transmit coil to another (e.g. to make room for a second device receiving power), the approach may dynamically detect this move.

In many embodiments, it may be advantageous to have forward messages to be transmitted relatively frequently and typically with a time interval of no more than 500 msec, or indeed no more than 200 msec in many embodiments. At the same time, it may in many scenarios be advantageous that the interval is not too short in order to not increase the communication burden too much. Indeed, in many embodiments, it is advantageous that the time interval between forward messages is no less than 10 msec. Such timings may allow a dynamic behavior particularly suitable for power transfer operations, and in particular may allow sufficiently fast detections of changes in the charging configuration without increasing the overhead unacceptably.

In many embodiments, the decision of when to transmit a new forward message may be made by the power transmitter 101.

For example, in many embodiments, the power transmitter 101 may start a timer whenever a new forward message is received, or e.g. when a positive confirmation indication is generated in response to receipt of an appropriate response message. When the time reaches a given value (say corresponding to 200 msec), the power transmitter 101 may generate and transmit a new forward message. Thus, in such an embodiment, the reverse communication link verifications may be repeated at regular intervals.

Alternatively or additionally, a new forward message may be transmitted in response to a detection of the occurrence of a given event.

For example, the power transmitter 101 may comprise a movement detector which is arranged to detect a movement of either the power transmitter 101 or the power receiver 105 (or both). Whenever a movement is detected, the power transmitter 101 may generate and transmit a new forward message. This may be particularly attractive as undesirable charging configurations may often occur as a consequence of a movement of the power transmitter 101 and the power receiver 105 relative to each other.

The movement detection may be arranged to directly or indirectly detect movement. For example, a motion detector may be implemented in the device comprising the power transmitter 101 and thus whenever this is physically moved it is directly detected. As another example, a proximity detector may be implemented in the power transmitter 101 which is arranged to detect objects including power receivers being positioned on the charge array of the power transmitter 101. If a change in such a proximity measure is detected, the power transmitter 101 may proceed to generate and transmit a new forward message.

In many embodiments, the detection of a movement is more indirect and may specifically be by a detection of a change in the power transfer operating characteristics.

For example, if a change in the loading of the transmit coil 103 is detected, this may be due to a movement of the power receiver 105 and accordingly the power transmitter 101 may proceed to generate and transmit a new forward message. The change in the power load may be measured directly, e.g. by a detection of an increase (or decrease) in the coil current. In some embodiments, it may be detected indirectly, e.g. by a detection of a step change in the power requested by the power receiver 105.

In many embodiments, it may be desirable for the control of the verification initiation being at least partially controlled by the power receiver 105. Specifically, the power receiver 105 may be arranged to transmit a message request to the power transmitter 101 and in response the power transmitter 101 may initiate a new verification process by transmitting a new forward message. Such an approach may for example allow a more reliable operation as some events may be easier to detect by the power receiver 105 than by the power transmitter 101. For example, movement of the power receiver 105 may be easier to detect by the power receiver 105 itself (e.g. by a motion detector comprised in the power receiver 105). Typically, undesirable power transfer configurations often occur as a function of the power receiver 105 being moved so this may prevent or mitigate the risk of such scenarios not being detected.

Furthermore, standards such as the Qi standard employ a design principle in which control of the power transfer operation is focused on the power receiver 105 and accordingly the approach may allow such design principles to be followed and may allow increased compatibility.

In many embodiments, the message request may be received over the reverse communication link. However, in some embodiments or scenarios, it may alternatively or additionally be received over another communication link, such as e.g. by a load modulation of the power transfer signal.

It will be appreciated that the considerations of when to initiate a new verification process described for the power transmitter 101 may apply mutatis mutandis to the power receiver 105. Specifically, the power receiver 105 may transmit the message request in response to an expiry of a time interval or a detection of a movement of the power receiver 105 and/or power transmitter 101.

Similarly, the power receiver 105 may transmit the message request in response to a detection of a change in the power transfer operating characteristics. Specifically, a new message request may be transmitted if the power receiver 105 detects a change in the power level of the power transfer signal. Such a change could occur as a function of the power receiver 105 being moved relative to the transmit coil 103 and accordingly the power receiver 105 may initiate a new verification process to ensure that the reverse communication link is still valid.

In some embodiments, the response message(s) provided by the power receiver 105 to the power transmitter 101 over the reverse communication link may comprise further information. This further information may in many embodiments also be used in the determination of whether to restrict the power level or whether to pursue with normal operation.

Specifically, in many embodiments, the response message may comprise an indication of a received power level for the power transfer signal. This received power level may be used to determine whether the power controller 303 should restrict the power to be below a given limit. In particular, if the received power level is below a given threshold, the power controller 303 may restrict the power level of the power transfer signal and otherwise it may proceed to operate a normal power control with the power receiver 105 controlling the power level of the power transfer signal.

The threshold is typically dependent on the current power level of the power transfer signal, and specifically the power may be restricted if the ratio between the transmit power level of the power transfer signal and the receive power level of the power transfer signal is below a given value.

The received power level provides a strong indication of the coupling between the transmit coil 103 and the receive coil 107. Thus, if the received power level is below a given value it is likely to be due to the coupling being too low. This may be due to an inappropriate positioning of the receive coil 107 and is likely to result in a strong uncontained magnetic field. Accordingly, it may be desirable to restrict the transmit power level and thus the magnitude of the magnetic field in such a scenario.

In the following, the approach will be described in more detail with reference to specific considerations and implementations of a power transfer system, such as e.g. the system of FIG. 1.

The approach is based on establishing a relation or association between a power transfer channel (the forward communication link) and a fully separated communication channel (the reverse communication link) in order to ensure that the power transmitter is only controlled via the communication channel by the power receiver to which the power is provided. The approach uses a forward communication link and a reverse communication link which has different communication ranges yet achieves a restriction of the effective range of the reverse communication link to that of the forward communication link.

The relationship may be established e.g. by the power receiver including an identifier of the power transmitter in the communication messages over the communication channel/reverse communication link.

The identifier may have been communicated from the power transmitter to the power receiver. The identifier may typically be unique for the transmit coil. In addition, data provided by the power transmitter and returned by the power receiver may include some time dependent data. For example, the data may include:

the identifier given as a manufacturing code+serial code
a counter value, or a time stamp.

The verification and the relationship may be updated or refreshed, e.g. when an event that justifies such refreshment occurs, e.g. in case of unexpected change of received power, or when the elapsed time since the last verification has reached a threshold.

The system may for example use the following approach for the power transfer.

First, it is checked by the power transmitter 101 whether a power receiver is located such that the power transfer is safe. Specifically, the power receiver may communicate measured signals that help the power transmitter to decide if power transfer is safe. E.g. the power transmitter may use the received power signal strength as a criterion to decide if power transfer is safe and/or may use other approaches, like the measuring of a stray field. This checks whether that the appliance is well positioned on the power transmitter.

A relation between the power transfer channel (the forward communication link) and the communication channel (the reverse communication link) is then established to ensure that the power transmitter is controlled by the power receiver to which it provides power.

The verification of the relation between the power channel and the communication channel may be based partly on temporal considerations. Specifically, the power receiver may be required to respond to a forward message within a given time.

This may address the problem wherein e.g. an appliance comprising the power receiver is moved. In most cases, sometime will pass between one appliance being moved and another being positioned on the same spot. As a consequence, the absence of an appliance will be detected by no response message being provided from the power receiver. However, if a second appliance replaces the first appliance without interruption (i.e. no period exist in which no appliance is positioned on the power transmitter) and the first appliance is moved to a second power transmitter, the first power transmitter will continue to provide power, but it will now be to the second appliance. However, the first appliance may still control the first power transmitter.

In order to avoid e.g. such scenarios, the verification of the relation between the power channel and the communication channel is based on the power receiver providing a response message indicating a property of a message received from the power transmitter. Specifically, the approach may further consider identification data for the power transmitter or transmit coil. The power receiver may be required to include a transmit coil or power transmitter identifier provided by the power transmitter in the response message.

This will address the above problem if the first appliance receives a different identifier from the second power transmitter via the second transmit coil and if it includes the new identifier in the respond messages. This new identifier will not be valid for the first power transmitter or for the first transmit coil and the first power transmitter will therefore detect the move and changed scenario.

However if the power receiver continues to include the identifier of the first transmitter or transmit coil, e.g. because it has not received a new identifier or due to an internal error, the first appliance may still control the first power transmitter or the power transmitter via the first transmit coil.

The verification of the relation between the power channel and the communication channel may therefor further consider identification data for the messages sent by the power transmitter. In addition the power receiver may be required to include a message identifier provided by the power transmitter in the response message. This will further address this problem, since the first appliance will no longer receive message identifiers from the first power transmitter or via the first transmit coil. Hence the first appliance cannot include these new message identifiers in the response messages, and consequently it will send invalid messages to the first power transmitter or to the power transmitter via the first transmit coil.

The verification may preferably consider both identity and timing with the timing being continuously updated.

In the system, the power transmitter only provides a strong magnetic field if the relationship between the power channel (the reverse communication link/power transfer signal) and the communication channel (reverse communication link) is verified.

However, before providing a strong magnetic field, the power transmitter may provide a weak and intrinsically safe power signal or communication signal for the purpose of establishing a relationship.

When a strong magnetic field is provided, the power transmitter regularly checks that the relationship is valid, and terminates the power transfer or reduces the magnetic field to an intrinsically safe level if it is detected that the relationship is no longer valid.

The triggering of the verification can be initiated by the power receiver requesting the transmission of a forward message. This may be caused by an event, e.g. when the user moves the appliance, which is e.g. detectable by an unexpected change in the measurement of the received power, voltage, or current. Alternatively or additionally, it may be caused by a time-out, e.g. if the elapsed time since the last verification exceeds a threshold of e.g. 100 ms. Alternatively or additionally, the verification may be initialized by the power transmitter.

The power transmitter may e.g. consider the following parameters to determine if the relationship is valid, i.e. whether the reverse communication link is considered verified:

The value of the identifier. If the value of the identifier (of the power transmitter and/or the transmit coil and/or of the message) does not correspond to the identifier value that the power transmitter has sent, it regards the relationship as invalid The time since the power transmitter sent the forward message with the identifier. If this time is larger than a first threshold, the relationship is considered invalid The time since the power transmitter has received the last response message from the power receiver containing a correct identifier. If this time is larger than a second threshold, the relationship is considered invalid The discrepancy between the amount of power sent by the power transmitter and the amount of power reported by the power receiver.

The specific example relates to a wireless power-transmitter having one or multiple transmitter elements via which it can provide power to a wireless power receiver. The power transmitter can selectively activate and/or modulate the transmitter elements to provide either a (low-power) ping signal, or to provide a (high power) power transfer signal.

A transmitter element typically contains a transmit coil (but could also contain multiple transmit coils) with the purpose of generating a magnetic field suitable for providing a magnetic field for transferring a ping signal or a power signal to a power receiver.

The power transmitter contains a communication unit that is designed such that it can communicate to one, or multiple power receivers nearby without (or hardly) being interfered from the ongoing power transfers between the power transmitter and the one, or more power receivers.

In addition the power transmitter can also communicate an identifier via the power channel/forward communication link. This identifier can e.g. be modulated as a bit stream on a ping signal or a power signal, e.g. by changing the amplitude, frequency, phase, pulse width, etc. The power transmitter assigns such identifier uniquely to the transmitter element via which the ping/power signal is transmitted.

The power transmitter can establish a relationship between the power channel (the forward communication link) and the communication channel (the reverse communication link) from the power receiver. The relationship ensures that the power transmitter uses only the control information it receives from the power receiver to which it transfers power.

The relationship between the forward communication link and the reverse communication link is based on a consideration of identification data. Specifically, the power transmitter expects a response message comprising the identification provided by the power transmitter 101 to be returned by the power receiver 105.

The power transmitter can refresh an established relationship by sending an updated identifier, i.e. by sending a new forward message. Such refreshment may be initiated by the power receiver, e.g. by a request for identification. The power transmitter may update its identifier e.g. by including a counter in the identifier, the counter being incremented at the update. The power transmitter may also update the identifier by including a time-stamp in the identifier.

The power transmitter is, based on the response data, able to decide whether to provide full power or to reduce power. If a response message is received with the correct data, it is a strong indication that the power receiver 105 is positioned correctly.

The specific example thus includes a wireless power receiver which is able to receive power from the wireless power transmitter. The power receiver contains one or more coils in order to receive a ping or power signal emitted by power transmitter.

Based on the strength of the induced voltage in the power receiver coil, the power receiver can determine if it is positioned well enough for power transfer. Moreover it can generate information (such as the received power level) for the power transmitter in order to indicate to this how well the power receiver is located or coupled. The power receiver can communicate the information derived from the induced voltage on the secondary coil to the power transmitter.

The power receiver can also communicate the identifier that the power transmitter has generated and communicated e.g. with the ping signal, back to the power transmitter.

The power receiver can establish a relationship between the power channel (the forward communication link) and the communication channel (the reverse communication link) with a power transmitter. The establishment of the relationship is used to ensure that the power receiver which receives the power is also the one which provides the control information to the power transmitter.

A power receiver can maintain the established relationship by including the latest received identifier received in a forward message in the response message it sends back to the power transmitter via the communication channel/reverse communication link. A power receiver can refresh the relationship by requesting new forward messages.

The power receiver and power transmitter may specifically follow the following process and protocols for performing a power transfer operation.

Firstly, in order to detect whether a power-receiver is located near a transmitter-element, the power transmitter can measure whether any kind of object is placed in the vicinity of the power coils. When an object is detected, the power transmitter transmits an initial power signal or ping signal to find out if the object is a power receiver. The level of the ping signal is so low that it is intrinsically safe.

A power receiver that is located near enough to a transmitter element will receive the ping signal. If needed, the power receiver uses the ping signal to power-up the electronics for communication. After it is powered-up, the power receiver sends an initial (first) message via the reverse communication link. The initial message indicates a request for identification and verification (and specifically that a forward message is transmitted from the power transmitter).

To minimize the reaction time of the power receiver in case it needs to be powered-up by the initial power signal, it will only activate the minimum amount of its electronics for sending the first message.

The time between the start of the ping signal and the initial message is typically limited to a range of e.g. 10 ms to 200 ms.

Figure 5:
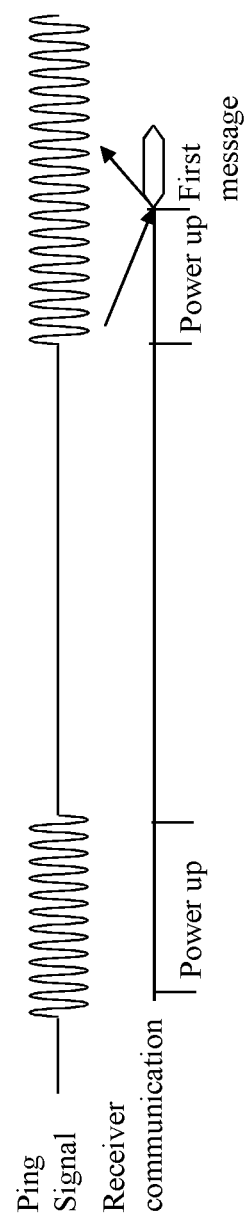
FIG. 5 illustrates an example of a timing for the power transfer system of FIG. 1.

FIG. 5 illustrates a possible timing for a transmitter-element that pings for a power-receiver.

On the first ping, the receiver might power up its energy storage (capacitor) but might not have sufficient energy to power the communication unit. Since the power transmitter does not receive any communication from the power receiver, it removes the signal.

On the second ping, the power receiver again powers up on the ping signal and activates the appropriate communication unit to communicate a message to the power transmitter. On reception of this message the power transmitter concludes that the object is a power receiver and continues to provide the ping signal for further communication.

Figure 6:
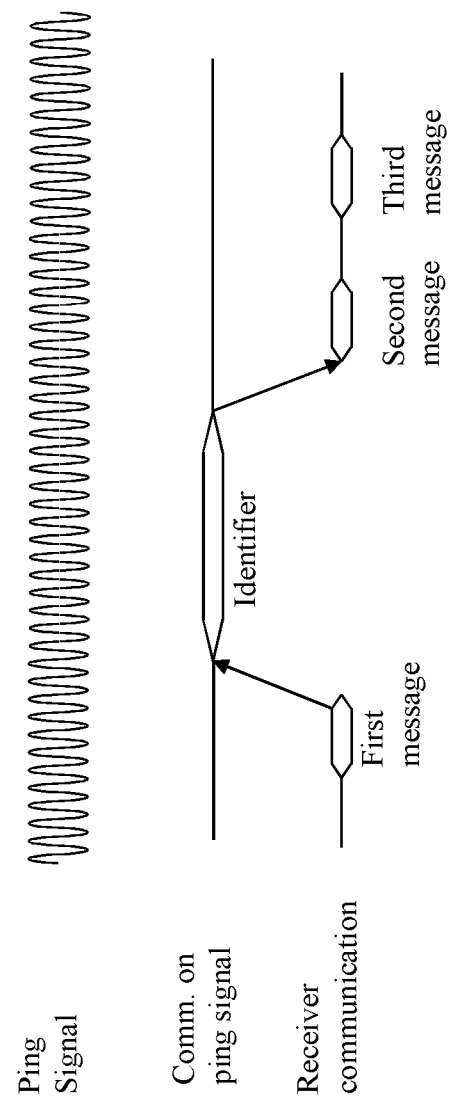
FIG. 6 illustrates an example of a timing for the power transfer system of FIG. 1.

FIG. 6 illustrates a possible timing after the power transmitter has received the initial (first) message from the power receiver. After the power transmitter has received the initial/first message, it continues to provide the ping signal, but in addition it modulates a forward message on the ping signal which contains the identifier of the transmitter element.

On reception of the forward message, the power receiver sends a second message which contains the identifier and a payload comprising e.g. the received signal strength (thereby providing an indication of the coupling of the receive coil to the transmit coil).

Figure 7:
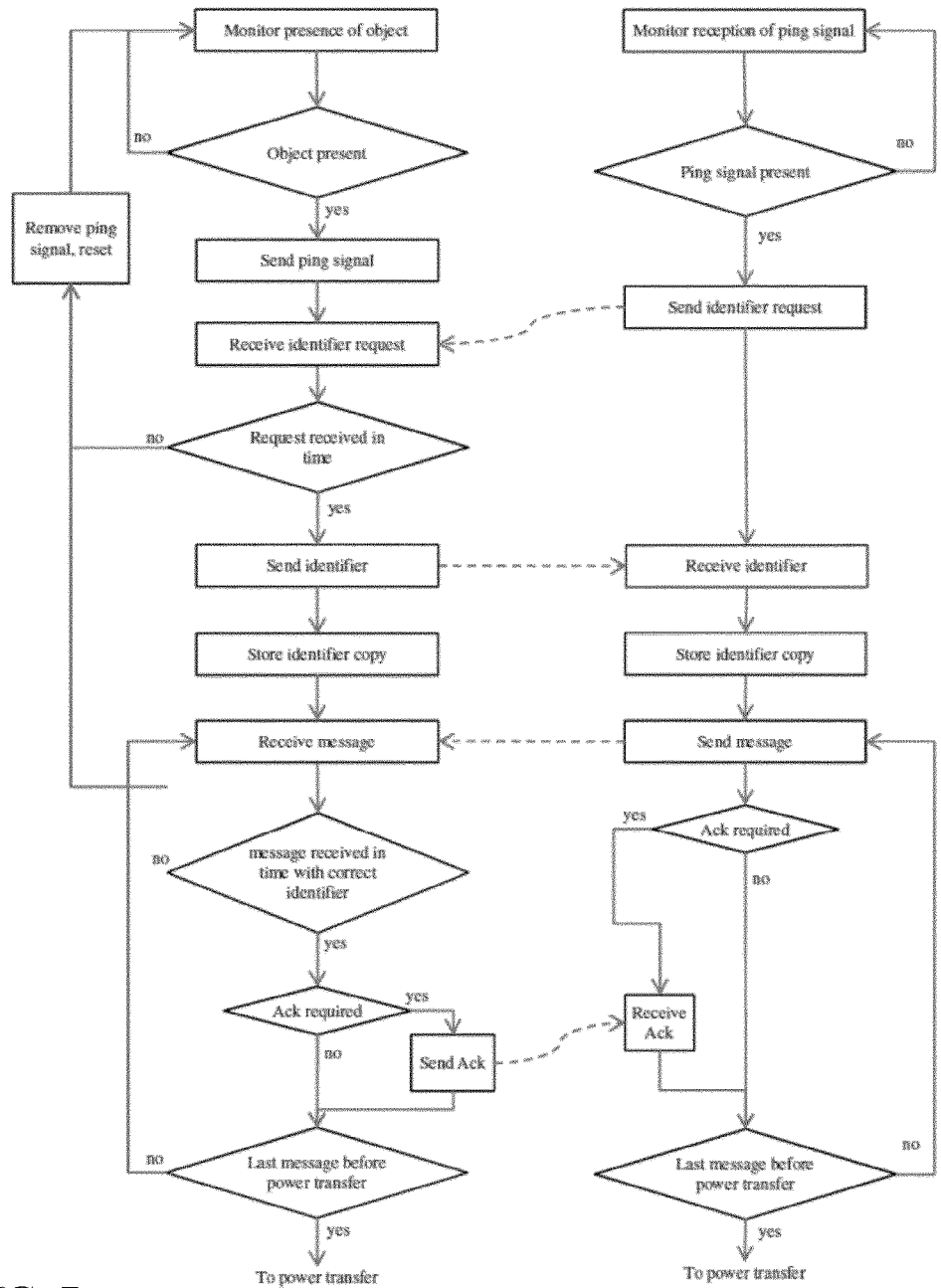
FIG. 7 illustrates an example of operations performed in the power transfer system of FIG. 1.

FIG. 7 illustrates the exemplary operations of the power transmitter and the power receiver before and after the power receiver is positioned on the power transmitter and until the start of the power transfer phase.

In the example, the power transmitter monitors if any object is positioned on its surface. If it detects any object, it evaluates if this is a power receiver by sending out a ping signal.

A power receiver when positioned on the power transmitter detects the presence of the ping signal and sends out a message request, and specifically an identifier request which requests the power transmitter to transmit an identifier to the power receiver.

The power transmitter in response transmits the forward message and specifically transmits an identifier modulated on the ping signal. After transmitting the identifier, the power transmitter stores a copy of it for later use. If the power transmitter does not receive the message request in time it removes the ping signal, resets and returns to the initial state.

After receiving the identifier, the power receiver stores a copy of it for later use and sends a response message which includes the transmitter identifier. The power transmitter (receiving the response message in time) checks if the response message contains the correct identifier. If the power transmitter does not receive a message from the power receiver in time, or if the message contains an incorrect identifier, it removes the ping signal, resets and returns to the initial state. If the power transmitter is required to acknowledge the received message, it sends an acknowledge message. Such an acknowledge message may be only to confirm the reception of the message, or may e.g. contain an answer to a request or query comprised in the response message. E.g. if the power receiver queries whether the power transmitter supports a certain power level, the message may include a response to this. The power transmitter may specifically respond with an negative acknowledge message indicating that it has received the message correctly, but that it does not support the requested power level. The power receiver will first attempt to receive the acknowledge message before it continues. If a time-out occurs in receiving the acknowledge message, the power receiver may repeat its request by resending the same message, or ultimately by restarting the complete procedure (not shown in the figure).

The power receiver continues to send messages (including the copy of the power transmitter identifier) until it proceeds to the power transfer phase, or until it no longer detects a ping signal. The power transmitter continues to receive and check messages until it proceeds to the power transfer phase, or removes the ping signal.

After establishing a power transfer contract, the power receiver and power transmitter proceed to the power transfer phase. In this phase the power receiver sends power control messages via the reverse communication link to control the power signal of the power transmitter. The power transmitter thereby takes care that the power signal remains within a safe limit.

In order to prevent ambiguity, the power receiver includes the up-to-date identifier of the transmitter element at each message it communicates to the power transmitter. The power transmitter checks at the reception of the message if the identifier corresponds to the transmitter element. If not the message is disregarded.

Figure 8:
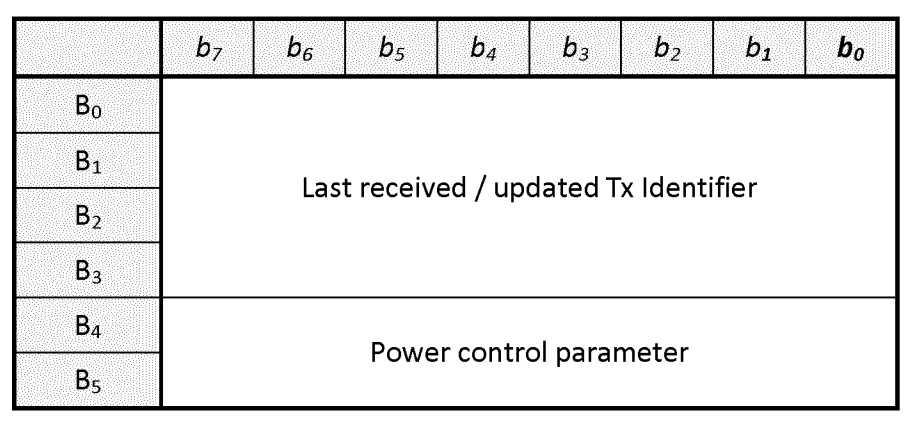

FIG. 8 illustrates an example of a response message communicated from power receiver to power transmitter. In the example, the response message is also a power control message. The first part of the message contains the transmitter identifier (identifier of the power transmitter element) and the second part of the message contains a power control parameter. A given message may be considered to be both a power control message and a response message.

In the example, the power receiver sends a request for identification when
 it detects a relevant event, e.g. an unexpected change in the received power, or
 the elapsed time since the last request exceeds a threshold.

In response to such a request, the power transmitter transmits a new forward message via the power channel/forward communication link.

In order to verify the reverse communication link, the power transmitter
 checks if the elapsed time since the last forward message is within a first time limit, e.g. 200 ms.
 checks if the elapsed time since the last received message from the power receiver is within a second time limit of e.g. 30 ms and contains a correct identifier.

If one or both of these two conditions is violated, the power transmitter reduces the power signal to an intrinsically safe level, or removes the power signal.

Figure 9:
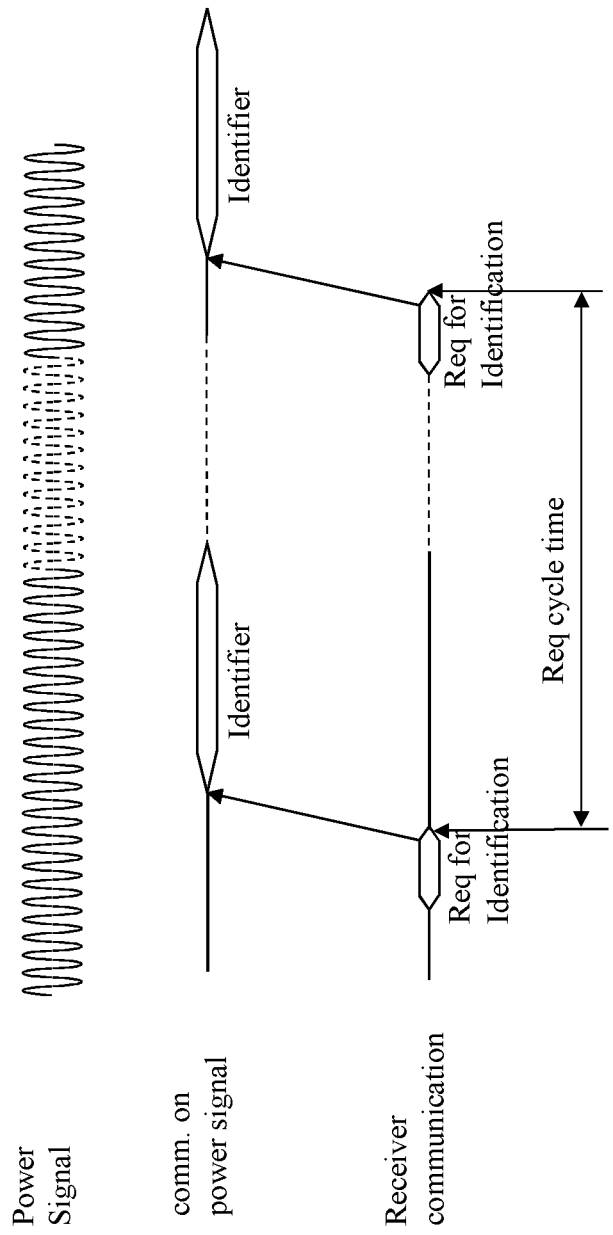
FIG. 9 illustrates an example of a timing for the power transfer system of FIG. 1.

FIG. 9 illustrates an example of the timing for keeping the relation between power transmitter and power receiver up-to-date during power transfer. In this figure the Req cycle time is the time between two succeeding identifier requests. On request for identification, the power transmitter sends its identifier in a forward message, by e.g. modulating the power signal.

Figure 10:
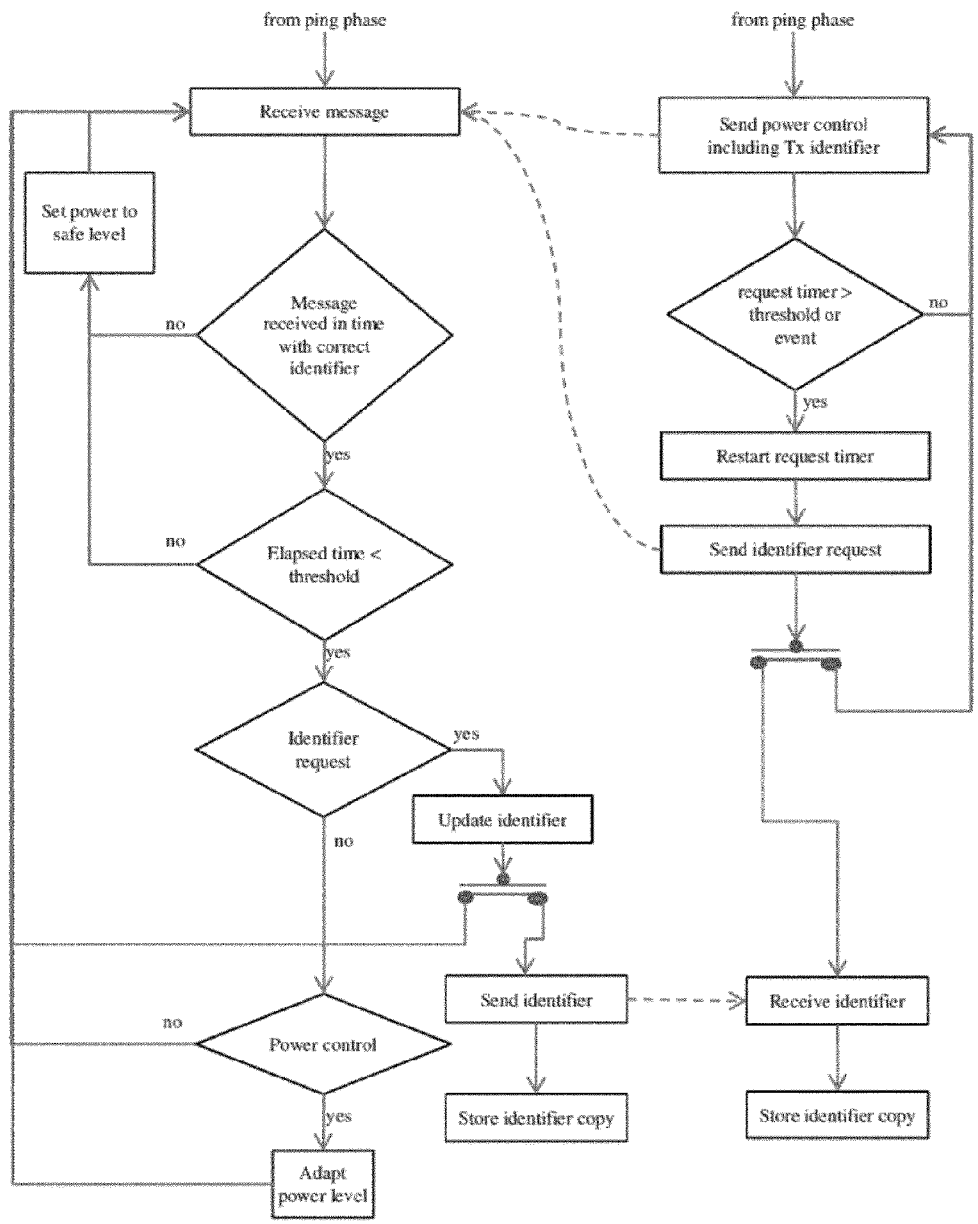
FIG. 10 illustrates an example of operations performed in the power transfer system of FIG. 1.

FIG. 10 illustrates exemplary operations of the power transmitter and the power receiver during the power transfer phase.

In the example, the power receiver first sends a response message in the form of a power control message which includes the copy of the power transmitter identifier (which the power receiver has obtained from the power transmitter in the ping phase). The power receiver then checks if it needs to refresh the relationship with the power transmitter or not by comparing the value of a request timer with a threshold or by detecting an event that justifies the refreshment. If it decides to refresh, the power receiver restarts the request timer and requests that a new forward message is sent. For this purpose the power receiver transmits a request message including the copy of the power transmitter identifier to the power transmitter. Since the reception of the forward message could take considerable time (due to the fact that the identifier from transmitter to receiver is sent over coupled coils and thus is using a communication link with a very low data rate), the power receiver continues to send response messages in the form of power control messages (which contain the previously received identifier). After reception of the new identifier in the forward message, the power receiver updates the internal copy of the identifier used for including in the response/power control messages transmitted to the power transmitter.

The power receiver determines the timing of the response/power control messages in response to its need for changing the power signal, e.g. if the required change of power exceeds a threshold or the time elapsed since the last power control message exceeds a given level (not shown in the figure).

The power transmitter receives response/power control messages from the power receiver. If it does not receive a correct message in time, (e.g. if the time since the previous received message containing a correct identifier is too long), the power transmitter reduces the power signal to an intrinsically safe level. If the relationship with the power receiver is outdated, (e.g. if the elapsed time since the power transmitter received a correct request for a new forward message is above a given threshold), the power transmitter will also reduce the power level to an intrinsically safe level. Otherwise, if a correct response/power control message is received in time and if the relationship is up-to-date, the power transmitter further evaluates the received message. If the message is a request for a new forward message, the power transmitter updates the identifier, e.g. by incrementing a counter included in the identifier and starts sending it to the power receiver. If the message is a response/power control message, the power transmitter adapts the power level according to the control error. After the power transmitter has taken the appropriate action(s) related to the received message, it proceeds to the reception of the next message.

Since the transmission of a forward message could take considerable time (due to the fact that the identifier from transmitter to receiver is sent over coupled coils and thus is using a communication link with a very low data rate), the power transmitter continues to receive and check response/power control messages while transferring the forward message. After the transfer of the forward message is complete, the power transmitter updates an internal copy of the identifier used for validating the response/power control messages received from the power receiver.

In the previous examples, the forward communication link is established using the transmit coil 103 and the receive coil 107, and specifically by applying a modulation to the power transfer signal. However, in other embodiments, the forward communication link may be implemented using separate coils. For example, a separate transmit communication coil may be implemented for each transmit coil 103 and/or a separate receive communication coil may be implemented for each receive coil 107. The communication from the power transmitter 101 to the power receiver 105 may then be performed using this (these) separate communication coils. E.g. a separate carrier signal may be modulated by the relevant data and the resulting signal may be fed to the transmit communication coil. The receive communication coil may then demodulate the corresponding signal.

An advantage of using separated communication coils is that (low power) electronics needed for the communication will have a galvanic insulation from the high power electronics. A further advantage is that low power electronics may consume less power than high power electronics for generating a ping signal, which enables low standby power for detecting the presence of appliances.

The coupling between this forward communication signal and the power transfer signal may in many embodiments be reduced or substantially removed. For example, the communication carrier may use a frequency substantially higher than the frequency of the power transfer signal.

However, although the signals may not directly interfere with or depend on each other, the communication coils are arranged such that the communication using the forward communication link is closely linked to the power transfer in the sense that a successful forward communication between a power transmitter 101 and power receiver 105 is a very strong indication (and typically a guarantee) that the power transfer is also between these two entities. Specifically, in most embodiments, the arrangement is such that the messages transmitted by the power transmitter 101 using the separate communication coil(s) will only be received by the power receiver that is involved in the power transfer, i.e. by the power receiver 105 positioned on top of the transmit coil 103.

Thus, although the communication may in some embodiments use a forward communication link signal that is not based on either the transmitter coil 103 or the power transfer signal, the communication range of the forward communication link is still restricted to correspond to the power transfer range for the power transfer signal. In many embodiments, the ranges may be considered to correspond to each other if e.g. the communication range of the forward communication link is no more than twice the power transfer range. In other embodiments, the ranges may be considered to correspond to each other if e.g. the communication range of the forward communication link is no more than 50%, 20% or even 10% longer than the power transfer range.

This short range for the forward communication link may be achieved by the receive communication coil being proximal to the transmit coil 103 and the transmit communication coil being proximal to the receive coil 107.

Specifically, in most embodiments, the smallest rectangular (box) volume that includes both receive coil 107 and the receive communication coil is at most four times higher than the smallest rectangular (box) volume that includes only the receive coil 107 itself. Indeed, in many embodiments, the ratio is at most two times or less. Thus, the receive communication coil is positioned very close to the receive coil 107, and indeed in many embodiments the coils are positioned so close that the volumes overlap each other. For example, the receive communication coil may be positioned within the receive coil 107, or e.g. the receive coil 107 may be positioned within the receive communication coil.

Similarly, in most embodiments, the smallest rectangular (box) volume that includes both transmit coil 103 and the transmit communication coil is at most four times higher than the smallest rectangular (box) volume that includes only the transmit coil 103 itself. Indeed, in many embodiments, the ratio is at most two times. Thus, the transmit communication coil is positioned very close to the transmit coil 103, and indeed in many embodiments the coils are positioned so closely that the volumes overlap each other. For example, the transmit communication coil may be positioned within the transmit coil 103, or e.g. the transmit coil 103 may be positioned within the transmit communication coil.

In many embodiments, the power transfer and communication coils are planar coils. In such embodiments, the coils may be positioned very closely together, typically by arranging one coil concentrically within the other, or may forming the coils as intertwined spirals.

In most such embodiments, the smallest rectangular area that includes both the receive coil 107 and the receive communication coil is at most four times higher than the smallest rectangular area that includes only the receive coil 107 itself. Indeed, in many embodiments, the ratio is at most two times.

Similarly, in most embodiments, the smallest rectangular area that includes both the transmit coil 103 and the transmit communication coil is at most four times higher than the smallest rectangular area that includes only the transmit coil 103 itself. Indeed, in many embodiments, the ratio is at most two times.

In most embodiments, the distance from the center of the transmit coil 103 to an outer winding of the transmit communication coil is no more than twice the distance from the center of the transmit coil 103 to an outer winding of the transmit communication coil itself. In many embodiments, the distance is at most 50% higher. Specifically, for substantially circular coils, the diameter of the transmit communication coil is in such embodiments at most 100% or 50% larger than the diameter of the transmit coil 103 (and indeed it may have a smaller diameter).

Similarly, in most embodiments, the distance from the center of the receive coil 107 to an outer winding of the receive communication coil is no more than twice the distance from the center of the receive coil 107 to an outer winding of the receive coil 107 itself. In many embodiments, the distance is at most 50% higher. Specifically, for substantially circular coils, the diameter of the receive communication coil is in such embodiments at most 100% or 50% larger than the diameter of the receive coil 107 (and indeed it may have a smaller diameter).

Figure 11:
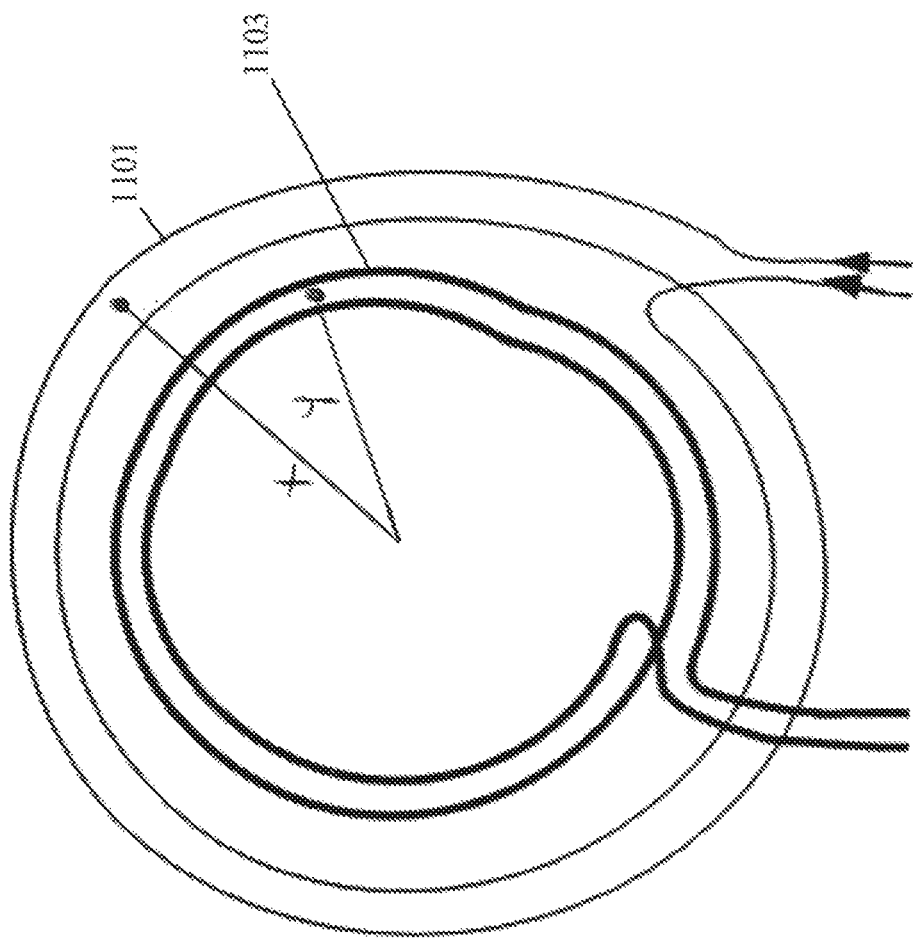
FIG. 11 illustrates an example of a coil configuration for the power transfer system of FIG. 1.

FIG. 11 illustrates an example of how two coils 1101, 1103 may be arranged concentrically to achieve the desired result. In the example, the first coil 1101 may be the receive communication coil and the second coil 1103 may be the receive coil 107 or indeed the first coil 1101 may be the receive coil 107 and the second coil 1103 may be the receive communication coil. Similarly, the first coil 1101 may be the transmit communication coil and the second coil 1103 may be the transmit coil 103, or indeed the first coil 1101 may be the transmit coil 103 and the second coil 1103 may be the transmit communication coil. The very close physical positions of the two coils ensure that the forward communication link provided by the communication coils also ensures correct positioning of the receive coil 107 over the transmit coil 103.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A wireless power transfer system comprising:
a power transmitter comprising:
a transmit power transfer coil for transferring power to a power receiver via a power transfer signal,
a first communication unit for communicating messages to the power receiver on a first communication link using a first communication coil being at least one of the transmit power transfer coil and a transmit communication coil proximal to the transmit power transfer coil, the first communication unit being arranged to transmit a first message to the power receiver, the first communication link having a range corresponding to a power transfer range for the power transfer signal; wherein the power transmitter is arranged to transmit the first message in response to an event from the group consisting of: a detection of a movement of the power receiver; a detection of a change in a load of the transmit power transfer coil; a detection of a change in a load of the transmit communication coil,
a second communication unit arranged to receive data from the power receiver on a second communication link, the second communication link not using the first communication coil and having a range exceeding the range of the first communication link, and
a power receiver comprising:
a receive power transfer coil for receiving the power transfer signal,
a power load coupler for providing power to a load from the power transfer signal,
a third communication unit for receiving messages from the power transmitter on the first communication link using a second communication coil being at least one of the receive power transfer coil and a receive communication coil proximal to the receive power transfer coil, the third communication unit being arranged to receive the first message, from the power transmitter,
a response generator for generating a response message related to power control, said response message being generated in response to the first message, the response message being a message that is transmitted to the power transmitter in response to receiving the first message from the power transmitter, the response message including data which describes a property of the first message, said data indicating to the power transmitter that the first message has been received by the power receiver thus providing a reliable and secure means for the system to determine whether received messages are from a desired power receiver, the data comprising at least one of data comprising a subset of the received message and data comprising a parameter related to the frequency of the received message,
a fourth communication unit for transmitting the response message to the power transmitter over the second communication link not using the second communication coil;
the power transmitter further comprising:
a response processor for determining an expected response message to the first message, the expected response message being related to power control comprising data indicating to the power transmitter that the first message has been received by the power receiver first message;
a validity checker for generating a confirmation indication indicative of whether a power control message is received on the second communication link corresponding to the expected response message, the confirmation indication being indicative of whether the property indication matches the expected property indication;
a power controller for controlling a power level of the power transfer signal in response to the confirmation indication.

2. The wireless transfer system of claim 1 wherein the first communication unit is arranged to generate the first message to comprise first data, the response generator is arranged to generate response data from the first data and to include the response data in the response message; the response processor is arranged to determine expected response data in response to the first data; and the validity checker is arranged to generate the confirmation indication in response to an evaluation of whether the message received on the second communication link comprises data matching the expected response data.

3. The wireless transfer system of claim 2 wherein the first data comprises an indication of at least one of an identity of the power transmitter and an identity of the transmit power transfer coil.

4. The wireless transfer system of claim 2 wherein the first data comprises an indication of at least one of a transmit time for the first message and a message identity.

5. The wireless transfer system of claim 1 wherein the validity checker is arranged to determine a time delay from transmission of the first message to receipt of the message on the second communication link, and to determine the confirmation indication in response to the time delay.

6. The wireless transfer system of claim 1 wherein the power transmitter is arranged to repeatedly transmit first messages, and the power transmitter is arranged to repeatedly generate confirmation indications for messages received on the second communication link.

7. The wireless transfer system of claim 6 wherein the power transmitter is arranged to restrict the power level to not exceed a threshold unless expected response messages are received for the first messages within a time interval from the first messages being transmitted.

8. The wireless transfer system of claim 6 wherein a time interval between consecutive first messages does not exceed 500 msec.

9. The power transfer system of claim 1 wherein the power transmitter is arranged to transmit the first message in response to an event from the group consisting of:
an expiry of a time interval;
a detection of a movement of the power receiver;
a detection of a change in a load of the transmit power transfer coil;
a detection of a change in a load of the transmit communication coil.

10. The power transfer system of claim 1 wherein the power receiver is arranged to transmit a message request to the power transmitter; and the power transmitter is arranged to transmit the first message in response to receiving the message request.

11. The power transfer system of claim 10 wherein the power receiver is arranged to transmit the message request in response to an event from the group consisting of:
an expiry of a time interval;
a detection of a movement of the power receiver;
a detection of a change in the power transfer signal;
a detection of a change in a signal received by the receive communication coil.

12. The power transfer system of claim 1 wherein the first communication coil is the transmit power transfer coil; and the first communication unit is arranged to modulate the first message onto the power transfer signal.

13. The power transfer system of claim 12 wherein the power transmitter is arranged to modulate the first message onto a ping power transfer signal.

14. The power transfer system of claim 1 wherein the power controller is arranged to restrict the power level to not exceed a power limit unless the confirmation indication is indicative of the message received on the second communication link matching the expected response message.

15. The power transfer system of claim 1 wherein the first communication coil is the communication transmit coil, and a distance from a center of the transmit power transfer coil to an outer winding of the transmit communication coil is no more than twice a distance from the center of the transmit power transfer coil to an outer winding of the transmit power transfer coil.

16. The power transfer system of claim 1 wherein the response message comprises an indication of a received power level for the power transfer signal, and the power controller is arranged to restrict the power level of the power transfer signal to below a power limit if the indication of the received power level indicates a received power level below a threshold.

17. A power transmitter for a wireless power transfer system comprising:
a transmit power transfer coil for transferring power to a power receiver via a power transfer signal;
a first communication unit for communicating messages to the power receiver on a first communication link using a first communication coil being at least one of the transmit power transfer coil and a transmit communication coil proximal to the transmit power transfer coil, the first communication unit being arranged to transmit a first message to the power receiver, the first communication link having a range corresponding to a power transfer range for the power transfer signal; wherein the power transmitter is arranged to transmit the first message in response to an event from the group consisting of: a detection of a movement of the power receiver; a detection of a change in a load of the transmit power transfer coil; a detection of a change in a load of the transmit communication coil,
a second communication unit arranged to receive data from the power receiver on a second communication link, the second communication link not using the first communication coil and having a range exceeding the range of the first communication link;

a response processor for determining an expected response message to the first message, the expected response message related to power control, said message transmitted to the power transmitter in response to receiving the first message from the power transmitter, the response message including data which describes a property of the first message, said data indicating to the power transmitter that the first message has been received by the power receiver thus providing a reliable and secure means for the system to determine whether received messages are from a desired power receiver, the data comprising at least one of data comprising a subset of the received message and data comprising a parameter related to the frequency of the received message;

a validity checker for generating a confirmation indication indicative of whether a power control message is received on the second communication link corresponding to the expected response message and comprising a property indication corresponding to the expected property indication; and a power controller for controlling a power level of the power transfer signal in response to the confirmation indication.

18. A power receiver for a wireless power transfer system comprising:
a receive power transfer coil for receiving a power transfer signal from a power transmitter;
a power load coupler for providing power to a load from the power transfer signal;
a first communication unit for receiving messages from the power transmitter on a first communication link using a second communication coil being at least one of the receive power transfer coil and a receive communication coil proximal to the receive power transfer coil,
the first communication unit being arranged to receive a first message from the power transmitter and,
the first communication link having a range corresponding to a power transfer range for the power transfer signal;
a response generator for generating a response message in response to the first message, the response message being a message that is transmitted to the power transmitter in response to receiving the first message from the power transmitter, the response message being related to power control and including data which describes a property of the first message, said data indicating to the power transmitter that the first message has been received by the power receiver thus providing a reliable and secure means for the system to determine whether received messages are from a desired power receiver, the data comprising at least one of data comprising a subset of the received message and data comprising a parameter related to the frequency of the received message; and
a second communication unit for transmitting the response message to the power transmitter over a second communication link not using the second communication coil, the second communication link having a range exceeding the range of the first communication link.

19. A method of operation for a wireless power transfer system, the method comprising:
a power transmitter performing the steps of:
a power transfer coil transferring power to a power receiver via a power transfer signal,
communicating messages to the power receiver on a first communication link using a first communication coil being at least one of the transmit power transfer coil and a transmit communication coil proximal to the transmit power transfer coil, the messages including a first message, the first communication link having a range corresponding to a power transfer range for the power transfer signal; wherein the power transmitter is arranged to transmit the first message in response to an event from the group consisting of: a detection of a movement of the power receiver; a detection of a change in a load of the transmit power transfer coil; a detection of a change in a load of the transmit communication coil,
receiving data from the power receiver on a second communication link, the second communication link not using the first communication coil and having a range exceeding the range of the first communication link; and
a power receiver performing the steps of:
a receive power transfer coil receiving the power transfer signal,
providing power to a load from the power transfer signal,
receiving messages from the power transmitter on the first communication link using a second communication coil being at least one of the receive power transfer coil and a receive communication coil proximal to the receive power transfer coil, the messages including the first message,
generating a response message to the first message, the response message being a message that is transmitted to the power transmitter in response to receiving the first message from the power transmitter, the response message being related to power control and including data which describes a property of the first message, said data indicating to the power transmitter that the first message has been received by the power receiver thus providing a reliable and secure means for the system to determine whether received messages are from a desired power receiver, the data comprising at least one of data comprising a subset of the received message and data comprising a parameter related to the frequency of the received message;
transmitting the response message to the power transmitter over the second communication link not using the second communication coil; and
the power transmitter further performs the steps of:
determining an expected response message to the first message, the expected response message being related to power control comprising an expected property indication for the property of the first message;
generating a confirmation indication indicative of whether a power control message is received on the second communication link corresponding to the expected response message, the confirmation indication being indicative of whether the property indication matches the expected property indication; and
controlling a power level f the power transfer signal in response to the confirmation indication.

20. A method of operation for a power transmitter of a wireless power transfer system, the method comprising:

a power transfer coil transferring power to a power receiver via a power transfer signal;

communicating messages to the power receiver on a first communication link using a first communication coil being at least one of the transmit power transfer coil and a transmit communication coil proximal to the transmit power transfer coil, the first communication link having a range corresponding to a power transfer range for the power transfer signal and the messages including a first message; wherein the power transmitter is arranged to transmit the first message in response to an event from the group consisting of: a detection of a movement of the power receiver; a detection of a change in a load of the transmit power transfer coil; a detection of a change in a load of the transmit communication coil, receiving data from the power receiver on a second communication link, the second communication link not using the first communication coil and having a range exceeding the range of the first communication link;

determining an expected response message to the first message, the expected response message being a message that is transmitted to the power transmitter in response to receiving the first message from the power transmitter, the response message being related to power control and including data which describes a property of the first message, said data indicating to the power transmitter that the first message has been received by the power receiver thus providing a reliable and secure means for the system to determine whether received messages are from a desired power receiver, the data comprising at least one of data comprising a subset of the received message and data comprising a parameter related to the frequency of the received message;

generating a confirmation indication indicative of whether a power control message is received on the second communication link corresponding to the expected response message and comprising a property indication corresponding to the expected property indication; and controlling a power level of the power transfer signal in response to the confirmation indication.

21. A method of operation for a power receiver of a wireless power transfer system, the method comprising:

a receive power transfer coil receiving a power transfer signal from a power transmitter;

providing power to a load from the power transfer signal;

receiving messages from the power transmitter on a first communication link using a second communication coil being at least one of the receive power transfer coil and a receive communication coil proximal to the receive power transfer coil, the messages including a first message from the power transmitter and the first communication link having a range corresponding to a power transfer range for the power transfer signal;

generating a response message in response to the first message, the response message being response message being a message that is transmitted to the power transmitter in response to receiving the first message from the power transmitter, the response message being related to power control and including data which describes a property of the first message, said data indicating to the power transmitter that the first message has been received by the power receiver thus providing a reliable and secure means for the system to determine whether received messages are from a desired power receiver, the data comprising at least one of data comprising a subset of the received message and data comprising a parameter related to the frequency of the received message;

and transmitting the response message to the power transmitter over a second communication link not using the second communication coil, the second communication link having a range exceeding the range of the first communication link.

* * * * *